(12) United States Patent
Fuchs et al.

(10) Patent No.: US 12,325,806 B2
(45) Date of Patent: Jun. 10, 2025

(54) PHOTOCURABLE COMPOSITION FOR USE IN 3D PRINTING

(71) Applicant: BASF SE, Ludwigshafen am Rhein (DE)

(72) Inventors: Andre Fuchs, Basel (CH); Claudia Gisela Cordes, Lemfoerde (DE); Hendrik Wagner, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 1002 days.

(21) Appl. No.: 17/276,713

(22) PCT Filed: Sep. 20, 2019

(86) PCT No.: PCT/EP2019/075276
§ 371 (c)(1),
(2) Date: Mar. 16, 2021

(87) PCT Pub. No.: WO2020/064522
PCT Pub. Date: Apr. 2, 2020

(65) Prior Publication Data
US 2022/0033678 A1 Feb. 3, 2022

(30) Foreign Application Priority Data
Sep. 24, 2018 (EP) .................... 18196328

(51) Int. Cl.
| | | |
|---|---|---|
| C09D 175/16 | (2006.01) |
| B33Y 70/00 | (2020.01) |
| C08G 18/12 | (2006.01) |
| C08G 18/32 | (2006.01) |
| C08G 18/42 | (2006.01) |
| C08G 18/66 | (2006.01) |
| C08G 18/67 | (2006.01) |
| C08G 18/73 | (2006.01) |
| C08G 18/75 | (2006.01) |
| C08G 18/76 | (2006.01) |
| B29C 64/124 | (2017.01) |
| B29K 75/00 | (2006.01) |
| B33Y 10/00 | (2015.01) |

(52) U.S. Cl.
CPC ............ C09D 175/16 (2013.01); B33Y 70/00 (2014.12); C08G 18/12 (2013.01); C08G 18/3206 (2013.01); C08G 18/4238 (2013.01); C08G 18/6644 (2013.01); C08G 18/672 (2013.01); C08G 18/73 (2013.01); C08G 18/755 (2013.01); C08G 18/758 (2013.01); C08G 18/7621 (2013.01); B29C 64/124 (2017.08); B29K 2075/00 (2013.01); B33Y 10/00 (2014.12)

(58) Field of Classification Search
None
See application file for complete search history.

(56) References Cited

U.S. PATENT DOCUMENTS

| | | | |
|---|---|---|---|
| 4,575,330 A | 3/1986 | Hull | |
| 4,844,144 A * | 7/1989 | Murphy | B22C 7/02 264/401 |
| 5,496,870 A * | 3/1996 | Chawla | C08G 18/48 522/90 |
| 5,587,405 A * | 12/1996 | Tanaka | C09D 11/101 525/445 |
| 5,945,463 A * | 8/1999 | Kawabuchi | C08F 299/06 522/100 |
| 7,211,368 B2 | 5/2007 | Coats et al. | |
| 2003/0164580 A1 | 9/2003 | Rinker et al. | |
| 2018/0046076 A1 | 2/2018 | Letko et al. | |

FOREIGN PATENT DOCUMENTS

| | | |
|---|---|---|
| CN | 1458943 A | 11/2003 |
| EP | 1385055 A1 | 1/2004 |
| EP | 1337596 B1 | 9/2006 |
| EP | 2436510 A1 | 4/2012 |
| EP | 2636511 A1 | 9/2013 |
| JP | 863117023 A | 5/1988 |
| JP | H0859759 A | 3/1996 |
| JP | 2004115771 A | 4/2004 |
| JP | 2004307783 A | 11/2004 |
| JP | 2011162770 A * | 8/2011 |

(Continued)

OTHER PUBLICATIONS

European Search Report for EP Patent Application No. 18196328.1, Issued on Mar. 11, 2019, 3 pages.

(Continued)

*Primary Examiner* — Sanza L. McClendon
(74) *Attorney, Agent, or Firm* — Armstrong Teasdale LLP

(57) ABSTRACT

Described herein are photocurable compositions,
(A) a polyester urethane acrylate, or methacrylate (A),
(B) an acrylamide, or methacrylamide component (B), and
(C) a photoinitiator (C), where the polyester urethane acrylate, or methacrylate (A) is obtained by reacting (A1) a hydroxyalkylacrylate, or hydroxyalkylmethacrylate, (A2) an aliphatic diisocyanate, an aliphatic polyisocyanate, a cycloaliphatic diisocyanate, a cycloaliphatic polyisocyanate, an aromatic diisocyanate, or an aromatic polyisocyanate, or mixtures thereof, (A3) a polyester polyol, and (A4) optionally a second polyol.

The compositions, from which cured three-dimensional shaped articles having high toughness, high E modulus and impact strength can be made, are particularly suitable for the production of three-dimensional articles by stereolithography.

19 Claims, No Drawings

(56) References Cited

FOREIGN PATENT DOCUMENTS

| | | |
|---|---|---|
| JP | 5578060 B2 | 8/2014 |
| JP | 2018079617 A | 5/2018 |
| WO | 2012045660 A1 | 4/2012 |
| WO | 2015194487 A1 | 12/2015 |
| WO | 2018106977 A1 | 6/2018 |

OTHER PUBLICATIONS

William C. Wolf, "Toughening Oligomer Review for 3D Printing", RadTech, Conference Proceedings, May 15-18, 2016, 7 pages.
International Search Report and Written Opinion for corresponding PCT/EP2019/075276 mailed Dec. 10, 9 Pages.

\* cited by examiner

PHOTOCURABLE COMPOSITION FOR USE IN 3D PRINTING

CROSS-REFERENCE TO RELATED APPLICATIONS

This application is a U.S. National Phase Application of International Patent Application No. PCT/EP2019/075276, filed Sep. 20, 2019, which claims the benefit of priority to European Patent Application No. 18196328.1, filed Sep. 24, 2018, the entire contents of which are hereby incorporated by reference herein.

The present invention relates to photocurable compositions, comprising
(A) a polyester urethane acrylate, or methacrylate (A),
(B) an acrylamide, or methacrylamide component (B), and
(C) a photoinitiator (C), wherein the polyester urethane acrylate, or methacrylate (A) is obtained by reacting (A1) a hydroxyalkylacrylate, or hydroxyalkylmethacrylate, (A2) an aliphatic diisocyanate, an aliphatic polyisocyanate, a cycloaliphatic diisocyanate, a cycloaliphatic polyisocyanate, an aromatic diisocyanate, or an aromatic polyisocyanate, or mixtures thereof, (A3) a polyester polyol, and (A4) optionally a second polyol. The compositions, from which cured three-dimensional shaped articles having high toughness, high E modulus and impact strength can be made, are particularly suitable for the production of three-dimensional articles by stereolithography.

William C. Wolf, Toughening Oligomer Review for 3D Printing, RadTech US, Conference Proceedings, Chicago, 2016, performed a benchmarking study of various oligomer structures with a focus on their performance in tension and more specifically impact resistance. Polyether based formulations dominate the performance for impact resistance in the low molecular weight regime and a decrease in impact performance was observed as the molecular weight increased through the samples. Polyester based formulations demonstrated an increase in impact resistance as molecular weight of the oligomer increased. In contrast to the polyether trends, incorporating polyester base urethanes provide an overall tougher network that can absorb a larger amount of energy before breaking.

JP63-117023A discloses a resin composition containing polyurethane (meth)acrylate and acryloylmorpholine. Examples of desirable polyurethane (meth)acrylates include polyether polyurethane acrylate, polyester polyurethane acrylate, etc. The amount of the polyurethane (meth)acrylate used is preferably 10-80 wt percent based on the resin composition. Acryloylmorpholine is used is preferably in an amount of 5-60 wt percent based on the resin composition.

EP1337596B1 relates to a radiation curable ink jettable ink composition, comprising:
(A) 1 to 40 percent by weight of an oligomer that is a reaction product of ingredients comprising:
(a) an aliphatic polyisocyanate comprising two or more isocyanate groups; and
(b) a radiation curable alcohol comprising one or more radiation curable moieties, one or more hydroxyl moieties, and one or more polycaprolactone ester moieties; and
(B) 60 to 90 percent by weight of a reactive diluent; wherein the viscosity of the ink composition is up to about 50 centipoise (0.05 Pa·s) at 25° C. and wherein the ink composition is solvent-free.

U.S. Pat. No. 7,211,368B2 is directed to a liquid stereolithography resin comprising
a first urethane acrylate oligomer,
a first acrylate monomer,
a polymerization modifier,
a second urethane acrylate oligomer different from the first urethane acrylate oligomer, and
a stabilizer; wherein
the first urethane acrylate oligomer is an aliphatic polyester urethane diacrylate oligomer, wherein
the first acrylate monomer is ethoxylated (3) trimethylolpropane acrylate, and the polymerization modifier is selected from the group consisting of isobornyl acrylate, ethoxylated (5) pentaerythritol tetraacrylate, an aliphatic urethane acrylate, tris-(2-hydroxyethyl)isocyanurate triacrylate, and mixtures thereof, wherein
the resin includes 5-35 weight percent an aliphatic polyester urethane diacrylate oligomer and 0.5-25 weight percent ethoxylated (3) trimethylolpropane acrylate, wherein the resin includes 15-45 weight percent ethoxylated (5) pentaerythritol tetraacrylate.

EP2636511 is directed to a modeling material for forming a photofabrication model in ink-jet three dimensional printing method, comprising
a curable resin component with a weighted average of SP value of 9.0 to 10.3, the curable resin component containing a monofunctional ethylenically unsaturated monomer (A),
a polyfunctional ethylenically unsaturated monomer containing no urethane group (B),
a urethane group-containing ethylenically unsaturated monomer (C) and
a photopolymerization initiator (D), wherein the content of (A) is 50 to 90%, the content of (B) is 3 to 25%, the content of (C) is 5 to 35%, and the content of (D) is 0.1 to 10% on the basis of the weight of the modeling material.

WO15194487A1 is directed to an active-energy ray-curable resin composition which comprises (a) bifunctional urethane (meth)acrylate oligomer having polyester skeleton, (b) acrylamide and/or its derivative and (c) monofunctional (meth)acrylate monomer having heterocyclic group. The component c) may be cyclic trimethylolpropane formal monoacrylate, or tetrahydrofurfuryl acrylate. The amount of acrylamide and/or its derivative is preferably 3 to 40% by weight, more preferably 5 to 20% by weight. The amount of monofunctional (meth)acrylate monomer having heterocyclic group is preferably 35 to 55% by weight. If the amount of component c) is below 35% by weight, the hardness is low.

EP1385055 relates to liquid radiation-curable compositions that comprise (A) at least one polymerizing organic substance comprising a mixture of (1) at least one alicyclic epoxide having at least two epoxy groups; and (2) at least one difunctional or higher functional glycidylether of a polyhydric compound; (B) at least one free-radical polymerizing organic substance comprising a mixture of (1) at least one aromatic di(meth)acrylate compound; and (2) optionally, at least one trifunctional or higher functional (meth)acrylate compound; and (C) at least one cationic polymerization initiator; (D) at least one free-radical polymerization initiator; (E) optionally at least one hydroxyl-functional aliphatic compound; and (F) at least one hydroxyl-functional aromatic compound; wherein the concentration of hydroxyl groups in the radiation-curable composition is at least about 1.1 equivalent OH groups per kilogram; wherein the concentration of epoxy groups in the radiation-curable composition is at least about 5.5 equivalent epoxy groups per kilogram; and wherein the amount of trifunctional or higher functional (meth)acrylate compound (B)(2) is from 0 percent to about 3 percent of the composition and the amount of aromatic di(meth)acrylate compound (B)(1) is at least 10 percent of the composition. The compositions, from which cured three-dimensional shaped articles having both high temperature resistance and high impact resistance can be made, are particularly suitable for the production of three-dimensional articles by stereolithography.

WO2012045660 discloses photocurable resin compositions comprising:

(A) at least one aliphatic polyester urethane acrylate or methacrylate component with average molecular weight (MW) between 400 and 3000 g/mol and preferably with a polydispersity (PDI) below 1.4, or any mixture thereof;

(B) at least one monofunctional vinylamide, acrylamide or methacrylamide component, preferably with a viscosity below 100 mPa s at 30° C., or any mixture thereof;

(C) at least one photo initiator, or any mixture thereof.

The urethane acrylate or methacrylate component (A) is produced by reacting a polyalkylene glycol, preferably a polyethyleneglycol, with caprolactone, isophoronediisocyanate and an hydroxyalkylacrylate, preferably hydroxyethylacrylate, and the monofunctional component (B) is an acrylamide or methacrylamide or any mixture thereof, preferably acryloylmorpholine. The resin composition comprises preferably (A) 20-60 percent by weight of the urethane acrylate or methacrylate component A;

(B) 10-70 percent by weight of the monofunctional vinylamide, acrylamide or methacrylamide component component B;

(C) 0.1-10 percent by weight of the photo initiator C;

(D) 1-20 percent by weight of a tetrafunctional acrylate or methacrylate component, or any mixture thereof;

(E) optionally 0.1-50 percent by weight of a difunctional acrylate or methacrylate component, or any mixture thereof, preferably a polyethylene glycol diacrylate or an ethoxylated bisphenol dimethacrylate, or a tricyclodecane dimethanol diacrylate, or any mixture thereof; based on the total weight of the composition.

US20180046076 discloses a three-dimensional printing photocurable composition for a flexible material based object, the composition comprising:

from 20 wt % to 70 wt % of an urethane acrylate component, based on the total weight of the composition, the urethane acrylate component including the capping reaction product of an acrylate and an isocyanate-terminated prepolymer, the isocyanate-terminated prepolymer being the reaction product of a polyisocyanate and at least one polyol having a molecular weight of at least 3000 g/mol;

from 20 wt % to 60 wt % of a multifunctional epoxide component that includes one or more multifunctional epoxides, based on the total weight of the composition;

from 1 wt % to 15 wt % of a monomer component that includes at least one of a multifunctional acrylate monomer and a multifunctional vinyl ether monomer, based on the total weight of the composition; and from 1 wt % to 8 wt % of a photoinitiator component, based on the total weight of the composition and its use in a stereolithography based three-dimensional printing process.

It has now been found, surprisingly, that the combination of components (A), (B) and (C)—without use of a tetrafunctional acrylate or methacrylate component—results in a photocurable composition which exhibits high photosensitivity, high curing speed, low shrinkage, high toughness, high E modulus and impact strength and good mechanical properties of the produced 3D objects.

By using the inventive compositions, a combination of mechanical properties (E modulus, elongation at break and impact strength) can be achieved which was not possible so far.

Accordingly, the present invention is directed to photocurable compositions, comprising (A) a polyester urethane acrylate, or methacrylate (A), (B) an acrylamide, or methacrylamide component (B), and (C) a photoinitiator (C), wherein the amount of component (A) is 30 to 60% by weight, especially 45 to 55% by weight and the amount of component (B) is 40 to 70% by weight, especially 45 to 55% by weight based on the amount of components (A) and (B), wherein the polyester urethane acrylate, or methacrylate (A) is obtained by reacting (A1) a hydroxyalkylacrylate, or hydroxyalkylmethacrylate, (A2) an aliphatic diisocyanate, an aliphatic polyisocyanate, a cycloaliphatic diisocyanate, a cycloaliphatic polyisocyanate, an aromatic diisocyanate, or an aromatic polyisocyanate, or mixtures thereof, (A3) a polyester polyol, and (A4) optionally a second polyol.

The photocurable compositions of the present invention have viscosities in the range of from 100 to 600 mPas at 50° C.

A three-dimensional article, which is a cured product of the photocurable composition of the present invention has optimized mechanical properties with desired balance of E modulus (1000-2000 MPa) and impact strength (Izod, unnotched) 80-150 kJ/m$^2$.

The hydroxyalkylacrylate, or hydroxyalkylmethacrylate (A1) is preferably a compound of formula $$\underset{\text{O}}{\overset{\text{R}^1}{\bigvee}}\underset{}{\overset{}{\bigvee}}\text{O}\underset{n}{\overset{}{\bigvee}}\text{OH,}$$

wherein $R^1$ is a hydrogen atom, or a methyl group, and n is 2 to 6, especially 2 to 4. Examples of (A1) include 2-hydroxyethyl acrylate, 2-hydroxyethyl methacrylate, 2- or 3-hydroxypropyl acrylate, 2- or 3-hydroxypropyl methacrylate, 4-hydroxybutyl methacrylate and 4-hydroxybutyl acrylate. 2-Hydroxyethyl acrylate is most preferred.

Hydroxyalkylacrylates, or hydroxyalkylmethacrylates (A1) having shorter alkyl chains (n is 2 to 4, especially 2) lead to a higher E modulus. Hydroxyalkylmethacrylates (A1) lead to a higher E modulus as compared to hydroxyalkylacrylates (A1).

According to the invention diisocyanates and polyisocyanates and mixtures thereof can be used as component (A2). In the context of the present invention diisocyanates, in particular aliphatic, cycloaliphatic and aromatic diisocyanates are preferred.

Furthermore, in the context of the present invention prereacted prepolymers can be used as isocyanate components, in which a polyol is reacted with an isocyanate in an upstream reaction step. The obtained products have terminal isocyanate groups and can be used as component (A2).

Examples of customary aliphatic and cycloaliphatic diisocyanates are tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or 1-methyl-2,6-cyclohexane diisocyanate, 4,4'-, 2,4'- and/or 2,2'-methylenedicyclohexyl diisocyanate (H12MDI).

Preferred aliphatic and cycloaliphatic polyisocyanates are hexamethylene 1,6-diisocyanate (HDI), 1-isocyanato-3,3,5-trimethyl-5-isocyanatomethylcyclohexane (isophorone diisocyanate, IPDI) and 4,4'-, 2,4'- and/or 2,2'-methylenedicyclohexyl diisocyanate (H12MDI); particular preference is given to H12MDI and IPDI or mixtures thereof.

Suitable aromatic diisocyanates include naphthylene 1.5-diisocyanate (NDI), tolylene 2,4- and/or 2,6-diisocyanate (TDI), diphenylmethane 2,2'-, 2,4'- and/or 4,4'-diisocyanate (MDI), 3,3'-dimethyl-4,4'-diisocyanato-diphenyl (TODI), p-phenylene diisocyanate (PDI), diphenylethan-4,4'-diisoyanate (EDI), diphenylmethandiisocyanate, 3,3'-dimethyl-diphenyl-diisocyanate, 1,2-diphenylethandiisocyanate and/or phenylene diisocyanat.

In the context of the present invention isocyanates of higher functionality may be used, such as, for example, triisocyanates, e.g. triphenylmethane 4,4', 4"-triisocyanate, and also the cyanurates of the above-mentioned diisocyanates, and also the oligomers obtainable via partial reaction of diisocyanates with water, e.g. the biurets of the above-mentioned diisocyanates, and also oligomers obtainable via controlled reaction of semicapped diisocyanates with polyols, where these have an average of more than 2 and preferably 3 or more hydroxy groups.

4,4'-, 2,4'- and/or 2,2'-methylenedicyclohexyl diisocyanate (H12MDI), isophorone diisocyanates (IPDI), and tolylene 2,4- and/or 2,6-diisocyanate (TDI) are preferred. IPDI and TDI are most preferred.

The polyester polyols (A3) are preferably derived from dicarboxylic acids and diols. The polyester polyols (A3) do not contain polyether units. Preferably, the polyester polyols (A3) have a number average molecular weight above 2000 g/mol.

The polyester polyols (A3), in particular polyesterdiols, can by way of example be produced from dicarboxylic acids having from 2 to 12 carbon atoms, preferably from 4 to 10 carbon atoms, and from polyhydric alcohols. Examples of dicarboxylic acids that can be used are: aliphatic dicarboxylic acids, such as succinic acid, glutaric acid, adipic acid, suberic acid, azelaic acid, and sebacic acid, or aromatic dicarboxylic acids, such as phthalic acid, isophthalic acid, and terephthalic acid. The dicarboxylic acids can be used individually or in the form of mixtures, for example in the form of a succinic, sebacic, and adipic acid mixture. To produce the polyesterdiols it can sometimes be advantageous to use, instead of the dicarboxylic acids, the corresponding dicarboxylic acid derivatives, such as carboxylic diesters having from 1 to 4 carbon atoms in the alcohol moiety, for example dimethyl terephthalate or dimethyl adipate, carboxylic anhydrides, such as succinic anhydride, glutaric anhydride, or phthalic anhydride, or acyl chloride. Examples of polyhydric alcohols are glycols having from 2 to 10 carbon atoms, preferably from 2 to 6 carbon atoms, e.g. ethylene glycol, diethylene glycol, 1,4-butanediol, 1,5-pentanediol, 1,6-hexanediol, 1,10-decanediol, 2,2-dimethyl-1,3-propanediol, 1,3-propanediol, 2-methyl-1,3-propanediol, 3-methyl-1,5-pentanediol, or dipropylene glycol. The polyhydric alcohols can be used individually or in the form of mixtures, for example in the form of a 1,4-butanediol mixture and/or 1,3-propanediol mixture.

It is also possible to make concomitant use of, alongside these materials, small amounts of up to 6 percent by weight, especially up to 3 percent by weight, based on the entire reaction mixture of components (A1), (A2), (A3) and (A4), of second polyols (A4) of low molecular weight (MW<400 g/mol, especially MW<300 g/mol, very especially MW<150 g/mol), such as, for example, glycerol and 1,1,1-trimethylolpropane.

In accordance with the invention it is preferable to use exclusively bifunctional starting compounds, i.e. polymerdiol and diisocyanate.

When, by way of example, dimethyl esters of dicarboxylic acids are used in the production of the preferred polyester polyols, it is also possible that, as a consequence of incomplete transesterification, small amounts of unreacted terminal methyl ester groups reduce the functionality of the polyesters to less than 2.0, for example to 1.95 or else to 1.90.

The process known to the person skilled in the art is used for the polycondensation to produce the polyester polyols that are preferably used in accordance with the invention, particularly preferably polyesterdiols, for example by initially using temperatures of from 150 to 270° C. at atmospheric pressure or slightly reduced pressure to remove the water of reaction and then slowly lowering the pressure, for example to from 5 to 20 mbar. A catalyst is in principle not necessary, but is preferably added. Examples of those that can be used for this purpose are tin(II) salts, titanium(IV) compounds, bismuth(III) salts, and others.

Polyester polyols (A3) derived from dicarboxylic acid and diols are preferred and, for example, described in US20160122465. The dicarboxylic acids used for making the polyester polyol include aliphatic, or cycloaliphatic dicarboxylic acids, or combinations thereof. Among them, aliphatic dicarboxylic acids are preferred. Suitable aliphatic dicarboxylic acids which can be used alone or in mixture typically contain from 4 to 12 carbon atoms and include: succinic acid, glutaric acid, adipic acid, pimelic acid, suberic acid, and the like. Adipic acid is preferred.

The diols used for making the polyester polyol include aliphatic, or cycloaliphatic diols, or combinations thereof, preferably aliphatic diols containing 2 to 8 carbon atoms and more preferably 2 to 6 carbon atoms. Some representative examples of aliphatic diols that can be used include ethylene glycol, 1,3-propanediol, 1,4-butanediol, 1,5-pentanediol, 1,6-hexanediol and the like.

In a preferred embodiment, only one kind of aliphatic dicarboxylic acid is used in making the polyester polyol. In another preferred embodiment, one or two kinds of aliphatic diols are used in making the polyester polyol. Most preferably, the polyester polyol is derived from adipic acid and ethylene glycol and 1,4-butanediol (poly(ethylene 1,4-butylene adipate) diol, PEBA). In the PEBA, the molar ratio of ethylene glycol to 1,4-butanediol is from 0.05:1 to 10:1, preferably from 0.2:1 to 5:1, more preferably 0.5:1 to 1.5:1, most preferred from 0.75:1 to 1.25:1.

The linear polyester polyol will typically have a number average molecular weight within the range of $4 \times 10^2$ to $7.0 \times 10^1$, preferably $8 \times 10^2$ to $6.0 \times 10^1$, more preferably $1 \times 10^3$ to $5.0 \times 10^1$. In a preferred embodiment, the linear polyol is polyester polyol derived from one kind of aliphatic dicarboxylic acid and two kinds of aliphatic diols and has a number average molecular weight of from $2.0 \times 10^1$ to $4.0 \times$ $10^1$. In another preferred embodiment, the linear polyol is polyester polyol derived from one kind of aliphatic dicarboxylic acid and one kind of aliphatic diol and has a number average molecular weight of from $1.5 \times 10^3$ to $4.0 \times 10^3$, and more preferably from $1.8 \times 10^3$ to $3.5 \times 10^3$. All molecular weights specified in this text have the unit of [g/mol] and refer, unless indicated otherwise, to the number average molecular weight (Mn).

The polyester urethane acrylates, or methacrylates (A) have viscosities in the range of from 2000 to 20000 mPas at 60° C.

The high impact strength is mainly caused by polyester polyols (A3).

In a preferred embodiment of the present invention no second polyol is used, as it may decrease the mechanical performance of the three-dimensional article.

In another preferred embodiment of the present invention a second polyol, such as, for example, glycerol, is used, to finetune the mechanical properties of the inventive urethane (meth)acrylates by introducing linear or branched structural elements.

Examples of monofunctional acrylamide or methacrylamide components (B) include such as acryloylmorpholine, methacryloylmorpholine, N-(hydroxymethyl)acrylamide, N-hydroxyethyl acrylamide, N-isopropylacrylamide, N-isopropylmethacrylamide, N-tert-butylacrylamide, N,N'-methylenebisacrylamide, N-(isobutoxymethyl)acrylamide, N-(butoxymethyl)acrylamide, N-[3-(dimethylamino)propyl]methacrylamide, N,N-dimethylacrylamide, N,N-diethylacrylamide, N-(hydroxymethyl)methacrylamide, N-hydroxyethyl methacrylamide, N-isopropylmethacrylamide, N-isopropylmethmethacrylamide, N-tert-butylmethacrylamide, N,N'-methylenebismethacrylamide, N-(isobutoxymethyl)methacrylamide, N-(butoxymethyl)methacrylamide, N-[3-(dimethylamino)propyl]methmethacrylamide, N,N-dimethylmethacrylamide and N,N-diethylmethacrylamide.

The at present, most preferred acrylamide, or methacrylamide component (B) is acryloylmorpholine.

In principle, the composition can comprise additional compounds having photopolymerizable groups, diluents and oligomers, in an amount of less than 10% by weight, especially less than 5% by weight based on the total amount of compounds having photopolymerizable groups.

Suitable monofunctional acrylate, methacrylate, or vinylamide components are listed below (reactive diluent). Monofunctional refers to the fact that the molecule of the compound exhibits only one acrylate, methacrylate, or vinylamide functional group. Examples of monofunctional vinylamide components include such as N-vinyl-pyrrolidone, vinyl-imidazole, N-vinylcaprolactame, N-(hydroxymethyl)vinylamide, N-hydroxyethyl vinylamide, N-isopropylvinylamide, N-isopropylmethvinylamide, N-tert-butylvinylamide, N,N'-methylenebisvinylamide, N-(isobutoxymethyl)vinylamide, N-(butoxymethyl)vinylamide, N-[3-(dimethylamino)propyl]methvinylamide, N,N-dimethylvinylamide, N,N-diethylvinylamide and N-methyl-N-vinylacetamide.

Examples of monofunctional methacrylate include isobornyl methacrylate, tetrahydrofurfuryl methacrylate, ethoxylated phenyl methacrylate, cyclohexylmethacrylate, lauryl methacrylate, stearyl methacrylate, octyl methacrylate, isodecyl methacrylate, tridecyl methacrylate, caprolactone methacrylate, nonyl phenol methacrylate, cyclic trimethylolpropane formal methacrylate, methoxy polyethyleneglycol methacrylates, methoxy polypropyleneglycol methacrylates, hydroxyethyl methacrylate, hydroxypropyl methacrylate and glycidyl methacrylate.

In addition, the photocurable composition may comprise difunctional, or tetrafunctional (meth)acrylates.

Examples of aliphatic or cycloaliphatic diacrylates include tricyclodecane dimethanol diacrylate, dioxane glycerol diacrylate, 1,6-hexanediol diacrylate, 3-methyl-1,5-pentanediol diacrylate, tripropylene glycol diacrylate, neopentyl glycol diacrylate, dimethyloltricyclodecane diacrylate, 1,4-dihydroxymethylcyclohexane diacrylate, 2,2-bis(4-hydroxy-cyclohexyl)propane diacrylate and bis(4-hydroxycyclohexyl)methane diacrylate.

Examples of aromatic diacrylates include bisphenol A polyethylene glycol diether diacrylate, 2,2'-methylenebis[p-phenylenepoly(oxyethylene)oxy]-diethyl diacrylate, hydroquinone diacrylate, 4, 4'-dihydroxybiphenyl diacrylate, bisphenol A diacrylate, bisphenol F diacrylate, bisphenol S diacrylate, ethoxylated or propoxylated bisphenol A diacrylate, ethoxylated or propoxylated bisphenol F diacrylate, ethoxylated or propoxylated bisphenol S diacrylate and bisphenol-A epoxy diacrylate.

Examples of polyethylenglycol diacrylates are tetraethyleneglycol diacrylate, polyethyleneglycol(200) diacrylate and polyethyleneglycol(400) diacrylate. Examples of aromatic dimethacrylates include ethoxylated (2) bisphenol A dimethacrylate, ethoxylated (2) bisphenol A dimethacrylate, ethoxylated (3) bisphenol A dimethacrylate, ethoxylated (4) bisphenol A dimethacrylate, ethoxylated (4) bisphenol A dimethacrylate, ethoxylated (10) bisphenol A dimethacrylate, hydroquinone dimethacrylate, 4,4'-dihydroxybiphenyl dimethacrylate, bisphenol A dimethacrylate, bisphenol F dimethacrylate, bisphenol S dimethacrylate, ethoxylated or propoxylated bisphenol A dimethacrylate, ethoxylated or propoxylated bisphenol F dimethacrylate, and ethoxylated or propoxylated bisphenol S dimethacrylate. Examples of aliphatic or cycloaliphatic dimethacrylates include 1,4-dihydroxymethylcyclohexane dimethacrylate, 2,2-bis(4-hydroxy-cyclohexyl)propane dimethacrylate and bis(4-hydroxycyclohexyl)methane.

Examples of tetrafunctional (meth)acrylates are bistrimethylolpropane tetraacrylate, pentaerythritol tetracrylate, tetramethylolmethane tetramethacrylate, pentaerythritol tetramethacrylate, bistrimethylolpropane tetramethacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates and polyester tetraacrylates.

In a particularly preferred embodiment the composition of the present invention does not comprise a tetrafunctional acrylate or methacrylate component.

Accordingly, the present invention is directed to photocurable compositions, comprising (A) a polyester urethane acrylate, or methacrylate (A), (B) an acrylamide, or methacrylamide component (B), and (C) a photoinitiator (C), wherein the amount of component (A) is 30 to 60% by weight, especially 45 to 55% by weight and the amount of component (B) is 40 to 70% by weight, especially 45 to 55% by weight based on the amount of components (A) and (B), wherein the polyester urethane acrylate, or methacrylate (A) is obtained by reacting (A1) a hydroxyalkylacrylate, or hydroxyalkylmethacrylate, (A2) an aliphatic diisocyanate, an aliphatic polyisocyanate, a cycloaliphatic diisocyanate, a cycloaliphatic polyisocyanate, an aromatic diisocyanate, or an aromatic polyisocyanate, or mixtures thereof, (A3) a polyester polyol, and (A4) optionally a second polyol, which does not comprise a tetrafunctional acrylate or methacrylate component.

Oligomers may include polyester acrylates, polyether acrylates, epoxy acrylates, and urethane acrylates.

In a particularly preferred embodiment components (A) and (B) are the only components of the composition which comprise photopolymerizable groups.

The photoinitiator (C) may be a single compound, or a mixture of compounds.

Examples of photoinitiators (C) are known to the person skilled in the art and for example published by Kurt Dietliker in "A compilation of photoinitiators commercially available for UV today", Sita Technology Textbook, Edinburgh, London, 2002.

Examples of suitable acylphosphine oxide compounds are of the formula XII $$R_{51}-\overset{O}{\underset{R_{50}}{P}}-\overset{O}{C}-R_{52}, \quad (XII)$$

wherein $R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;

or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{51}$ is —(CO)$R'_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;

$R_{52}$ and $R'_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom; $R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl;

In a particularly preferred embodiment the photoinitiator (C) is a compound of the formula (XII), such as, for example, bis(2,4,6-trimethylbenzoyl)-phenylphosphine oxide; 2,4,6-trimethylbenzoyl-diphenyl-phosphine oxide; ethyl (2,4,6 trimethylbenzoyl phenyl) phosphinic acid ester; (2,4,6-trimethylbenzoyl)-2,4-dipentoxyphenylphosphine oxide and bis(2,6-dimethoxybenzoyl)-2,4,4-trimethylpentylphosphine oxide.

Furthermore interesting are mixtures of the compounds of the formula (XII) with compounds of the formula (XI) as well as mixtures of different compounds of the formula (XII).

Examples are mixtures of bis(2,6-dimethoxybenzoyl)-2,4,4-trimethylpentylphosphine oxide with 1-hydroxy-cyclohexyl-phenyl-ketone, of bis(2,4,6-trimethylbenzoyl)-phenylphosphine oxide with 2-hydroxy-2-methyl-1-phenyl-propan-1-one, of bis(2,4,6-trimethylbenzoyl)-phenylphosphine oxide with ethyl (2,4,6 trimethylbenzoyl phenyl) phosphinic acid ester, etc.

Examples of suitable benzophenone compounds are compounds of the formula $$\text{(X)}$$

wherein $R_{65}$, $R_{66}$ and $R_{67}$ independently of one another are hydrogen, $C_1$-$C_4$alkyl, $C_1$-$C_4$-halogenalkyl, $C_1$-$C_4$alkoxy, Cl or $N(C_1$-$C_4$alkyl$)_2$; $R_{68}$ is hydrogen, $C_1$-$C_4$alkyl, $C_1$-$C_4$halogenalkyl, phenyl, $N(C_1$-$C_4$alkyl$)_2$, $COOCH_3$, —S—⟨phenyl⟩—$CH_3$, —O—$(CH_2)_n$—$\overset{O}{C}$—A—Q$\left[\text{A}-\overset{O}{C}-(CH_2)_n-O-\overset{R_{69}}{}\text{—⟨phenyl⟩—}\overset{O}{C}\text{—⟨phenyl⟩}\right]_x$ or —O—$\overset{O}{\underset{H_2}{C}}$—$\overset{O}{C}$—$[O-(CH_2)_4]_m$—O—$\overset{O}{\underset{H_2}{C}}$—$\overset{O}{C}$—O—⟨phenyl⟩—$\overset{O}{C}$—⟨phenyl⟩;

Q is a residue of a polyhydroxy compound having 2 to 6 hydroxy groups;

x is a number greater than 1 but no greater than the number of available hydroxyl groups in Q;

A is —[O(CH$_2$)$_b$CO]$_y$— or —[O(CH$_2$)$_b$CO]$_{(y-1)}$[O(CHR$_{69}$CHR$_{69'}$)$_a$]$_y$—;

$R_{69}$ and $R_{69'}$ independently of one another are hydrogen, methyl or ethyl; and if n (or a) is greater than 1 the radicals $R_{69}$ may be the same as or different from each other;

a is a number from 1 to 2;

b is a number from 4 to 5;

y is a number from 1 to 10;

n is; and m is an integer 2-10.

Specific examples are benzophenone, Esacure TZT® available from IGM, (a mixture of 2,4,6-trimethylbenzophenone and 4-methylbenzophenone), 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio) benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, 4-benzoyl-N,N-dimethyl-N-[2-(1-oxo-2-propenyl)oxy]ethylbenzenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; biphenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxy-ethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phenoxy-phenyl)-methanone; 3-(4-benzoyl-phenyl)-2-dimethylamino-2-methyl-1-phenyl-propan-1-one; (4-chloro-phenyl)-(4-octylsulfanyl-phenyl)-methanone; (4-chloro-phenyl)-(4-dodecylsulfanyl-phenyl)-methanone; (4-bromo-phenyl)-(4-octylsulfanyl-phenyl)-methanone; (4-dodecylsulfanyl-phenyl)-(4-methoxy-phenyl)-methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenylsulfonyl)propan-1-one (Esacure®1001 available from IGM).

Examples of suitable alpha-hydroxy ketone, alpha-alkoxyketone or alpha-aminoketone compounds are of the formula

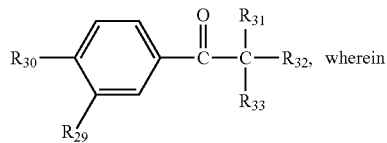
(XI)

$R_{29}$ is hydrogen or $C_1$-$C_{18}$alkoxy;

$R_{30}$ is hydrogen, $C_1$-$C_{18}$alkyl, $C_1$-$C_{12}$hydroxyalkyl, $C_1$-$C_{18}$alkoxy, $OCH_2CH_2$—$OR_3$, morpholino, S—$C_1$-$C_{18}$alkyl, a group —HC=$CH_2$, —C($CH_3$)=$CH_2$,

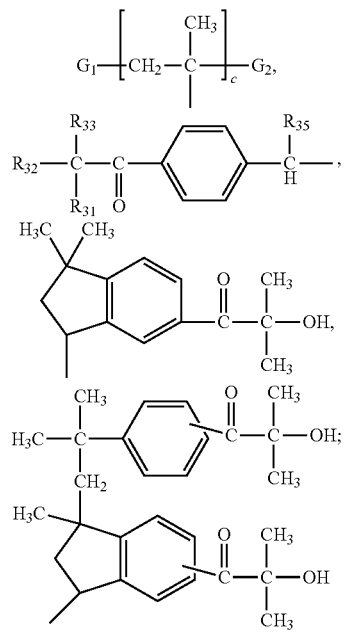

-continued

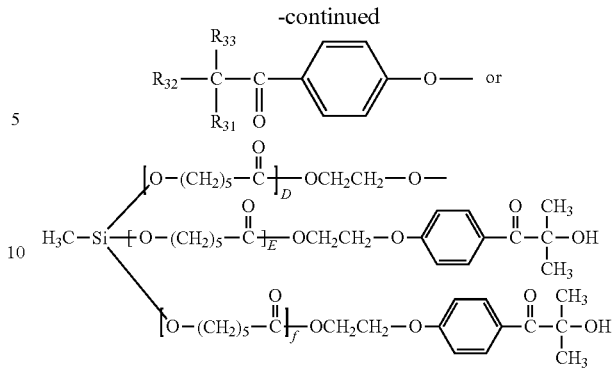

D, E and f are 1-3;

c is 2-10;

$G_1$ and $G_2$ independently of one another are end groups of the polymeric structure, preferably hydrogen or methyl;

$R_{34}$ is hydrogen,

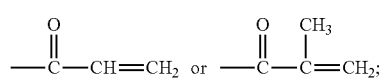

$R_{31}$ is hydroxy, $C_1$-$C_{16}$alkoxy, morpholino, dimethyl-amino or —O($CH_2CH_2O$)$_g$—$C_1$-$C_{16}$alkyl;

g is 1-20;

$R_{32}$ and $R_{33}$ independently of one another are hydrogen, $C_1$-$C_6$alkyl, $C_1$-$C_{16}$alkoxy or —O($CH_2CH_2O$)$_g$—$C_1$-$C_{16}$alkyl; or are unsubstituted phenyl or benzyl; or phenyl or benzyl substituted by $C_1$-$C_{12}$-alkyl; or $R_{32}$ and $R_3$ together with the carbon atom to which they are attached form a cyclohexyl ring;

$R_{35}$ is hydrogen, $OR_{36}$ or $NR_{37}R_{38}$;

$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH, or $R_{36}$ is

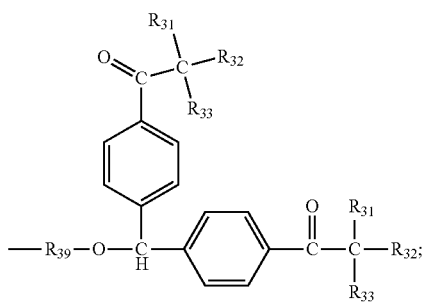

$R_{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—$C_1$-$C_{12}$alkylene-NH—(CO)— or

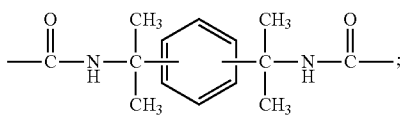

with the proviso that $R_{31}$, $R_{32}$ and $R_{33}$ not all together are $C_1$-$C_{16}$alkoxy or —O(CH$_2$CH$_2$O)$_g$—$C_1$-$C_{16}$alkyl.

Specific examples are 1-hydroxy-cyclohexyl-phenyl-ketone or a mixture of 1-hydroxy-cyclohexyl-phenyl-ketone with benzophenone), 2-methyl-1[4-(methylthio)phenyl]-2-morpholinopropan-1-one, 2-benzyl-2-dimethylamino-1-(4-morpholinophenyl)-butan-1-one, 2-dimethylamino-2-(4-methyl-benzyl)-1-(4-morpholin-4-yl-phenyl)-butan-1-one, (3,4-dimethoxy-benzoyl)-1-benzyl-1-dimethylamino propane, 1-[4-(2-hydroxyethoxy)-phenyl]-2-hydroxy-2-methyl-1-propan-1-one, 2,2-dimethoxy-1,2-diphenylethan-1-one, 2-hydroxy-2-methyl-1-phenyl-propan-1-one, 2-hydroxy-1-{4-[4-(2-hydroxy-2-methyl-propionyl)-benzyl]-phenyl}-2-methyl-propan-1-one, 2-hydroxy-1-{4-[4-(2-hydroxy-2-methyl-propionyl)-phenoxy]-phenyl}-2-methyl-propan-1-one, Esacure KIP provided by IGM, 2-hydroxy-1-{1-[4-(2-hydroxy-2-methyl-propionyl)-phenyl]-1,3,3-trimethyl-indan-5-yl}-2-methyl-propan-1-one.

Examples of suitable phenylglyoxylate compounds are of the formula

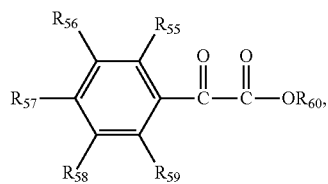

(XIII)

wherein $R_{60}$ is hydrogen, $C_1$-$C_{12}$alkyl or

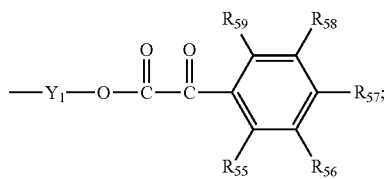

$R_{55}$, $R_{56}$, $R_{57}$, $R_{58}$ and $R_{59}$ independently of one another are hydrogen, unsubstituted $C_1$-$C_{12}$alkyl or $C_1$-$C_{12}$alkyl substituted by one or more OH, $C_1$-$C_4$alkoxy, phenyl, naphthyl, halogen or by CN; wherein the alkyl chain optionally is interrupted by one or more oxygen atoms; or $R_{55}$, $R_{56}$, $R_{57}$, $R_{58}$ and $R_{59}$ independently of one another are $C_1$-$C_4$alkoxy, $C_1$-$C_4$alkylthio or $NR_{52}R_{53}$;

$R_{52}$ and $R_{53}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{52}$ and $R_{53}$ independently of one another are $C_2$-$C_{12}$-alkenyl, cyclopentyl, cyclohexyl, benzyl or phenyl; and $Y_1$ is $C_1$-$C_{12}$alkylene optionally interrupted by one or more oxygen atoms.

Specific examples of the compounds of the formula XIII are oxo-phenyl-acetic acid 2-[2-(2-oxo-2-phenyl-acetoxy)-ethoxy]-ethyl ester (Irgacure®754), methyl α-oxo benzeneacetate.

Examples of suitable oxime ester compounds are of the formula

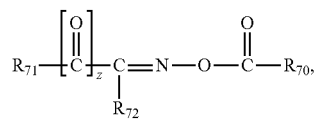

(XIV)

wherein z is 0 or 1;

$R_{70}$ is hydrogen, $C_3$-$C_8$cycloalkyl; $C_1$-$C_{12}$alkyl which is unsubstituted or substituted by one or more halogen, phenyl or by CN; or $R_{70}$ is $C_2$-$C_5$alkenyl; phenyl which is unsubstituted or substituted by one or more $C_1$-$C_6$alkyl, halogen, CN, $OR_{73}$, $SR_{74}$ or by $NR_{75}R_{76}$; or $R_{70}$ is $C_1$-$C_8$alkoxy, benzyloxy; or phenoxy which is unsubstituted or substituted by one or more $C_1$-$C_6$alkyl or by halogen;

$R_{71}$ is phenyl, naphthyl, benzoyl or naphthoyl, each of which is substituted by one or more halogen, $C_1$-$C_{12}$alkyl, $C_3$-$C_8$cycloalkyl, benzyl, phenoxycarbonyl, $C_2$-$C_{12}$alkoxycarbonyl, $OR_{73}$, $SR_{74}$, $SOR_{74}$, $SO_2R_{74}$ or by $NR_{75}R_{76}$, wherein the substituents $OR_{73}$, $SR_{74}$ and $NR_{75}R_{76}$ optionally form 5- or 6-membered rings via the radicals $R_{73}$, $R_{74}$, $R_{75}$ and/or $R_{76}$ with further substituents on the phenyl or naphthyl ring; or each of which is substituted by phenyl or by phenyl which is substituted by one or more $OR_{73}$, $SR_{74}$ or by $NR_{75}R_{76}$;

or $R_{71}$ is thioxanthyl, or

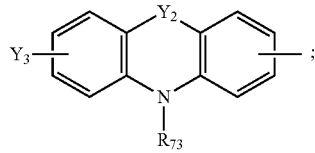

$R_{72}$ is hydrogen; unsubstituted $C_1$-$C_{20}$alkyl or $C_1$-$C_{20}$alkyl which is substituted by one or more halogen, $OR_{73}$, $SR_{74}$, $C_3$-$C_8$cycloalkyl or by phenyl; or is $C_3$-$C_8$cycloalkyl; or is phenyl which is unsubstituted or substituted by one or more $C_1$-$C_6$alkyl, phenyl, halogen, $OR_{73}$, $SR_{74}$ or by $NR_{75}R_{76}$; or is $C_2$-$C_{20}$alkanoyl or benzoyl which is unsubstituted or substituted by one or more $C_1$-$C_6$alkyl, phenyl, $OR_{73}$, $SR_{74}$ or by $NR_{75}R_{76}$; or is $C_2$-$C_{12}$alkoxycarbonyl, phenoxycarbonyl, CN, $CONR_{75}R_{76}$, $NO_2$, $C_1$-$C_4$haloalkyl, $S(O)_y$—$C_1$-$C_6$alkyl, or $S(O)_y$-phenyl, y is 1 or 2;

$Y_2$ is a direct bond or no bond;

$Y_3$ is $NO_2$ or

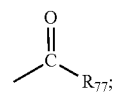

$R_{73}$ and $R_{74}$ independently of one another are hydrogen, $C_1$-$C_{20}$alkyl, $C_2$-$C_{12}$alkenyl, $C_3$-$C_8$cycloalkyl, $C_3$-$C_8$cycloalkyl which is interrupted by one or more, preferably 2, O, phenyl-$C_1$-$C_3$alkyl; or are $C_1$-$C_8$alkyl which is substituted by OH, SH, CN, $C_1$-$C_8$alkoxy, $C_1$-$C_8$alkanoyl, $C_3$-$C_8$cycloalkyl, by $C_3$-$C_8$cycloalkyl which is interrupted by one or more O, or which $C_1$-$C_8$alkyl is substituted by benzoyl which is unsubstituted or substituted by one or more $C_1$-$C_6$alkyl, halogen, OH, $C_1$-$C_4$alkoxy or by $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, $N(C_1$-$C_{12}$alkyl$)_2$, diphenylamino or by

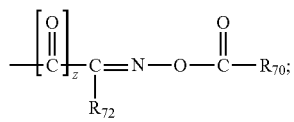

$R_{75}$ and $R_{76}$ independently of each other are hydrogen, $C_1$-$C_{20}$alkyl, $C_2$-$C_4$hydroxyalkyl, $C_2$-$C_{10}$alkoxyalkyl, $C_2$-$C_5$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or by $C_1$-$C_{12}$alkoxy; or $R_{75}$ and $R_{76}$ together are $C_2$-$C_6$alkylene optionally interrupted by O or $NR_{73}$ and optionally are substituted by hydroxyl, $C_1$-$C_4$alkoxy, $C_2$-$C_4$alkanoyloxy or by benzoyloxy;

$R_{77}$ is $C_1$-$C_{12}$alkyl, thienyl or phenyl which is unsubstituted or substituted by $C_1$-$C_{12}$alkyl, $OR_{73}$, morpholino or by N-carbazolyl.

Specific examples are 1,2-octanedione 1-[4-(phenylthio)phenyl]-2-(O-benzoyloxime), ethanone 1-[9-ethyl-6-(2-methylbenzoyl)-9H-carbazol-3-yl]-1-(O-acetyloxime), 9H-thioxanthene-2-carboxaldehyde 9-oxo-2-(O-acetyloxime), ethanone 1-[9-ethyl-6-(4morpholinobenzoyl)-9H-carbazol-3-yl]-1-(O-acetyloxime), ethanone 1-[9-ethyl-6-(2-methyl-4-(2-(1,3-dioxo-2-dimethyl-cyclopent-5-yl)ethoxy)-benzoyl)-9H-carbazol-3-yl]-1-(O-acetyloxime) (Adeka N-1919), ethanone 1-[9-ethyl-6-nitro-9H-carbazol-3-yl]-1-[2-methyl-4-(1-methyl-2-methoxy)ethoxy)phenyl]-1-(O-acetyloxime) (Adeka NC1831), etc.

It is also possible to add cationic photoinitiators, such as benzoyl peroxide (other suitable peroxides are described in U.S. Pat. No. 4,950,581, column 19, lines 17-25), or aromatic sulfonium, phosphonium or iodonium salts, such as are described, for example, in U.S. Pat. No. 4,950,581, column 18, line 60 to column 19, line 10.

Suitable sulfonium salt compounds are of formula

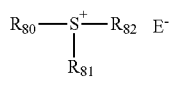 (XVa)

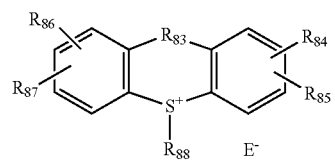 (XVb)

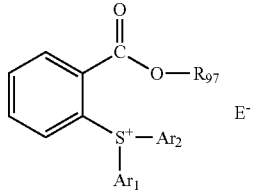 (XVc)

-continued

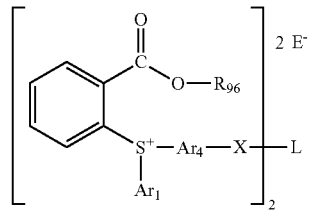 (XVd)

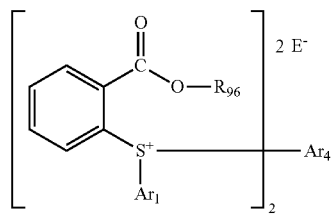 (XVe)

wherein $R_{80}$, $R_{81}$ and $R_{82}$ are each independently of the others unsubstituted phenyl, or phenyl substituted by —S-phenyl,

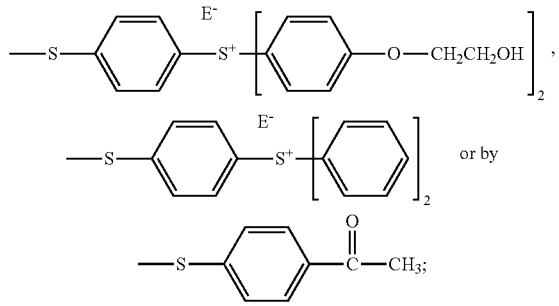

$R_{83}$ is a direct bond, S, O, $CH_2$, $(CH_2)_2$, CO or $NR_{89}$;
$R_{84}$, $R_{85}$, $R_{86}$ and $R_{87}$ independently of one another are hydrogen, $C_1$-$C_{20}$alkyl, $C_3$-$C_8$cycloalkyl, $C_1$-$C_{20}$alkoxy, $C_2$-$C_{20}$alkenyl, CN, OH, halogen, $C_1$-$C_6$alkylthio, phenyl, naphthyl, phenyl-$C_1$-$C_7$alkyl, naphthyl-$C_1$-$C_3$alkyl, phenoxy, naphthyloxy, phenyl-$C_1$-$C_7$alkyloxy, naphthyl-$C_1$-$C_3$alkyloxy, phenyl-$C_2$-$C_6$alkenyl, naphthyl-$C_2$-$C_4$alkenyl, S-phenyl, $(CO)R_{89}$, $O(CO)R_{89}$, $(CO)OR_{89}$, $SO_2R_{89}$ or $OSO_2R_{89}$;

$R_{88}$ is $C_1$-$C_{20}$alkyl, $C_1$-$C_{20}$hydroxyalkyl,

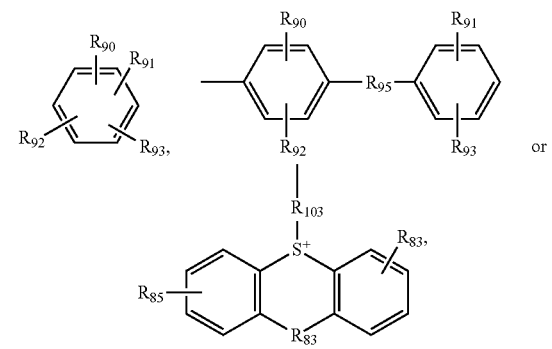

$R_{89}$ is hydrogen, $C_1$-$C_{12}$alkyl, $C_1$-$C_{12}$hydroxyalkyl, phenyl, naphthyl or biphenylyl;

$R_{90}$, $R_{91}$, $R_{92}$ and $R_{93}$ independently of one another have one of the meanings as given for $R_{84}$; or $R_{90}$ and $R_{91}$ are joined to form a fused ring system with the benzene rings to which they are attached;

$R_{95}$ is a direct bond, S, O or $CH_2$;

$R_{96}$ is hydrogen, $C_1$-$C_{20}$alkyl; $C_2$-$C_{20}$alkyl interrupted by one or more O; or is -L-M-$R_{98}$ or -L-$R_{98}$;

$R_{97}$ has one of the meanings as given for $R_{96}$ or is

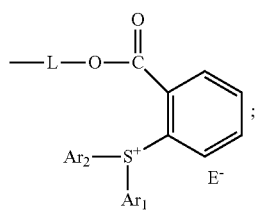

$R_{98}$ is a monovalent sensitizer or photoinitiator moiety;

$Ar_1$ and $Ar_2$ independently of one another are phenyl unsubstituted or substituted by $C_1$-$C_{20}$alkyl, halogen or $OR_{99}$;

or are unsubstituted naphthyl, anthryl, phenanthryl or biphenylyl;

or are naphthyl, anthryl, phenanthryl or biphenylyl substituted by $C_1$-$C_{20}$alkyl, OH or $OR_{99}$;

or are —$Ar_4$-$A_1$-$Ar_3$ or

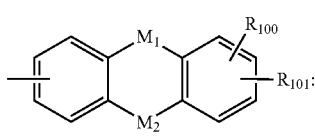

$Ar_3$ is unsubstituted phenyl, naphthyl, anthryl, phenanthryl or biphenylyl; or is phenyl, naphthyl, anthryl, phenanthryl or biphenylyl substituted by $C_1$-$C_{20}$alkyl, $OR_{99}$ or benzoyl;

$Ar_4$ is phenylene, naphthylene, anthrylene or phenanthrylene;

$A_1$ is a direct bond, S, O or $C_1$-$C_{20}$alkylene;

X is CO, C(O)O, OC(O), O, S or $NR_{99}$;

L is a direct bond, S, O, $C_1$-$C_{20}$alkylene or $C_2$-$C_{20}$alkylene interrupted by one or more non-consecutive O;

$R_{99}$ is $C_1$-$C_{20}$alkyl or $C_1$-$C_{20}$hydroxyalkyl; or is $C_1$-$C_{20}$alkyl substituted by $O(CO)R_{102}$;

$M_1$ is S, CO or $NR_{100}$;

$M_2$ is a direct bond, $CH_2$, O or S;

$R_{100}$ and $R_{101}$, independently of one another are hydrogen, halogen, $C_1$-$C_8$alkyl, $C_1$-$C_8$alkoxy or phenyl;

$R_{102}$ is $C_1$-$C_{20}$alkyl;

$R_{103}$ is

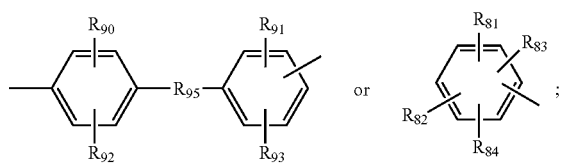

and

E is an anion, especially $PF_6$, $SbF_6$, $AsF_6$, $BF_4$, $(C_6F_5)_4B$, Cl, Br, $HSO_4$, $CF_3$—$SO_3$, F—$SO_3$

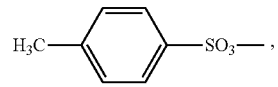

$CH_3$—$SO_3$, $ClO_4$, $PO_4$, $NO_3$, $SO_4$, $CH_3$—$SO_4$, or

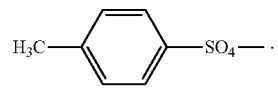

Specific examples of sulfonium salt compounds are for example Irgacure®270 (BASF SE); Cyracure® UVI-6990, Cyracure® UVI-6974 (Union Carbide), Degacure®KI 85 (Degussa), SP-55, SP-150, SP-170 (Asahi Denka), GE UVE 1014 (General Electric), SarCat® KI-85 (=triarylsulfonium hexafluorophosphate; Sartomer), SarCat® CD 1010 (=mixed triarylsulfonium hexafluoroantimonate; Sartomer); SarCat® CD 1011(=mixed triarylsulfonium hexafluorophosphate; Sartomer), Suitable iodonium salt compounds are of formula

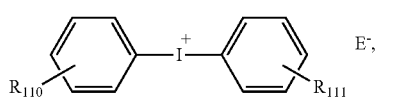

wherein $R_{110}$ and $R_{111}$ are each independently of the other hydrogen, $C_1$-$C_{20}$alkyl, $C_1$-$C_{20}$alkoxy, OH-substituted $C_1$-$C_{20}$alkoxy, halogen, $C_2$-$C_{12}$alkenyl, $C_3$-$C_8$cycloalkyl, especially methyl, isopropyl or isobutyl; and E is an anion, especially $PF_6$, $SbF_6$, $AsF_6$, $BF_4$, $(C_6F_5)_4B$, Cl, Br, $HSO_4$, $CF_3$—$SO_3$, F—$SO_3$,

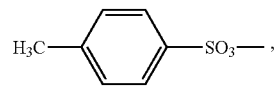

$CH_3$—$SO_3$, $ClO_4$, $PO_4$, $NO_3$, $SO_4$, $CH_3$—$SO_4$ or

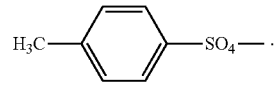

Specific examples of iodonium salt compounds are e.g. tolylcumyliodonium tetrakis(pentafluorophenyl)borate, 4-[(2-hydroxy-tetradecyloxy)phenyl]phenyliodonium hexafluoroantimonate or hexafluorophosphate, tolylcumyliodonium hexafluorophosphate, 4-isopropylphenyl-4'-methylphenyliodonium hexafluorophosphate, 4-isobutylphenyl-4'-methylphenyliodonium hexafluorophosphate (Irgacure® 250, BASF SE), 4-octyloxyphenylphenyliodonium hexafluorophosphate or hexafluoroantimonate, bis(dodecylphenyl)iodonium hexafluoroantimonate or hexafluorophosphate, bis(4-methylphenyl)iodonium hexafluorophosphate, bis(4-methoxyphenyl)iodonium hexafluorophosphate, 4-methylphenyl-4'-ethoxyphenyliodonium hexafluorophosphate, 4-methylphenyl-4'-dodecylphenyliodonium hexafluorophosphate, 4-methylphenyl-4'-phenoxyphenyliodonium hexafluorophosphate.

Of all the iodonium salts mentioned, compounds with other anions are, of course, also suitable. The preparation of iodonium salts is known to the person skilled in the art and described in the literature, for example U.S. Pat. Nos. 4,151,175, 3,862,333, 4,694,029, EP 562897, U.S. Pat. Nos. 4,399,071, 6,306,555, WO 98/46647 J. V. Crivello, "Photoinitiated Cationic Polymerization" in: UV Curing: Science and Technology, Editor S. P. Pappas, pages 24-77, Technology Marketing Corporation, Norwalk, Conn. 1980, ISBN No. 0-686-23773-0; J. V. Crivello, J. H. W. Lam, Macromolecules, 10, 1307 (1977) and J. V. Crivello, Ann. Rev. Mater. Sci. 1983, 13, pages 173-190 and J. V. Crivello, Journal of Polymer Science, Part A: Polymer Chemistry, Vol. 37, 4241-4254 (1999).

Acylphosphinoxides, such as, for example, bis(2,4,6-trimethylbenzoyl)-phenylphosphine oxide, 2,4,6-trimethylbenzoyl-diphenyl-phosphine oxide (TPO) and ethyl phenyl (2,4,6-trimethylbenzoyl)phosphinate, are preferred for curing with light sources having emission peak(s) in the UV-A range and (near) VIS range (Laser, LEDs, LCD). alpha-Hydroxy ketone type compounds, such as, for example, 1-hydroxy-cyclohexyl-phenyl-ketone, 2-hydroxy-2-methyl-1-phenyl-propan-1-one, 2-hydroxy-1-{4-[4-(2-hydroxy-2-methyl-propionyl)-benzyl]-phenyl}-2-methyl-propan-1-one, 1-[4-(2-hydroxyethoxy)-phenyl]-2-hydroxy-2-methyl-1-propan-1-one, Esacure KIP provided by Lamberti, 2-hydroxy-1-{1-[4-(2-hydroxy-2-methyl-propionyl)-phenyl]-1,3,3-trimethyl-indan-5-yl}-2-methyl-propan-1-one and mixtures thereof, are preferred for curing with UV laser having emission peak at 355 nm (SLA).

If the light source emitts radiation over a broad range, UV and visible range (e.g. mercury bilbs), or light sources of different wavelengths are combined (e.g. LEDs, laser), the absorption range of one photoinitiator might not cover the entire range. This can be achieved by combining two different photoinitiator types, e.g. alpha-hydroxy ketones (1-hydroxy-cyclohexyl-phenyl-ketone, 2-hydroxy-2-methyl-1-phenyl-propan-1-one, or 2-hydroxy-1-{4-[4-(2-hydroxy-2-methyl-propionyl)-benzyl]-phenyl}-2-methyl-propan-1-one) with acyl phosphinoxides (bis(2,4,6-trimethylbenzoyl)-phenylphosphine oxide, 2,4,6-trimethylbenzoyl-diphenyl-phosphine oxide and ethyl phenyl(2,4,6-trimethylbenzoyl)phosphinate. If visible radiation is used for curing specific photoinitiators like titanocenes, such as, for example, bis (cyclopentadienyl) bis [2,6-difluoro-3-(1-pyrryl)phenyl titanium (Omnirad 784) are required.

The photoinitiators are used typically in a proportion of from about 0.5 to 10% by weight, especially 0.1 to 5.0% by weight based on the total weight of composition.

Halogen is fluorine, chlorine, bromine and iodine.

$C_1$-$C_{24}$alkyl ($C_1$-$C_{20}$alkyl, especially $C_1$-$C_{12}$alkyl) is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethylpropyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl, or octadecyl. $C_1$-$C_8$alkyl is typically methyl, ethyl, n-propyl, isopropyl, n-butyl, sec.-butyl, isobutyl, tert.-butyl, n-pentyl, 2-pentyl, 3-pentyl, 2,2-dimethyl-propyl, n-hexyl, n-heptyl, n-octyl, 1,1,3,3-tetramethylbutyl and 2-ethylhexyl. $C_1$-$C_4$alkyl is typically methyl, ethyl, n-propyl, isopropyl, n-butyl, sec.-butyl, isobutyl, tert.-butyl.

$C_2$-$C_{12}$alkenyl ($C_2$-$C_5$alkenyl) groups are straight-chain or branched alkenyl groups, such as e.g. vinyl, allyl, methallyl, isopropenyl, 2-butenyl, 3-butenyl, isobutenyl, n-penta-2,4-dienyl, 3-methyl-but-2-enyl, n-oct-2-enyl, or n-dodec-2-enyl.

$C_1$-$C_{12}$alkoxy groups ($C_1$-$C_8$alkoxy groups) are straight-chain or branched alkoxy groups, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy and dodecyloxy.

$C_1$-$C_{12}$alkylthio groups ($C_1$-$C_8$ alkylthio groups) are straight-chain or branched alkylthio groups and have the same preferences as the akoxy groups, except that oxygen is exchanged against sulfur.

$C_1$-$C_{12}$alkylene is bivalent $C_1$-$C_{12}$alkyl, i.e. alkyl having two (instead of one) free valencies, e.g. trimethylene or tetramethylene.

A cycloalkyl group is typically $C_3$-$C_8$cycloalkyl, such as, for example, cyclopentyl, cyclohexyl, cycloheptyl, or cyclooctyl, which may be unsubstituted or substituted.

In several cases it is advantageous to in addition to the photoinitiator employ a sensitizer compound. Examples of suitable sensitizer compounds are disclosed in WO 06/008251, page 36, line 30 to page 38, line 8, the disclosure of which is hereby incorporated by reference. As sensitizer inter alia benzophenone compounds as described above can be employed.

In a particularly preferred embodiment the photocurable composition comprises (A) a polyester urethane acrylate, or methacrylate (A), (B) acryloylmorpholine, and (C) a photoinitiator (C), which is a compound of formula (XII), wherein the amount of component (A) is 30 to 60% by weight, especially 45 to 55% by weight and the amount of component (B) is 40 to 70% by weight, especially 45 to 55% by weight based on the amount of components (A) and B), wherein the polyester urethane acrylate, or methacrylate (A) is obtained by reacting (A1) 2-hydroxyethyl acrylate, 2-hydroxyethyl methacrylate, 2- or 3-hydroxypropyl acrylate, 2- or 3-hydroxypropyl methacrylate, 4-hydroxybutyl methacrylate, and 4-hydroxybutyl acrylate, (A2) isophorone diisocyanates (IPDI), or tolylene 2,4- and/or 2,6-diisocyanate (TDI), and (A3) a polyester polyol, which is derived from adipic acid and ethylene glycol and 1,4-butanediol (poly(ethylene 1,4-butylene adipate) diol, PEBA), and optionally (A4) glycerol, with the proviso that components (A) and (B) are the only components of the composition which comprise photopolymerizable groups.

The molar ratio of ethylene glycol to 1,4-butanediol in (poly(ethylene 1,4-butylene adipate) diol is from 0.05:1 to 10:1, preferably from 0.2:1 to 5:1, more preferably 0.5:1 to 1.5:1, most preferred from 0.75:1 to 1.25:1. The polyester polyol has a number average molecular weight within the range of $4 \times 10^2$ to $7.0 \times 10^1$, preferably $8 \times 10^2$ to $6.0 \times 10^1$, more preferably $1 \times 10^3$ to $5.0 \times 10^1$.

If desired, the photocurable compositions may comprise further mixture constituents which are preferably selected from
- at least one component D which is in turn selected from
  - (D.4) defoamers and deaerating agents;
  - (D.5) lubricants and leveling agents;
  - (D.6) thermally curing and/or radiation-curing auxiliaries;
  - (D.7) substrate wetting auxiliaries;
  - (D.8) wetting and dispersing auxiliaries;
  - (D.9) hydrophobizing agents;
  - (D.10) in-can stabilizers; and
  - (D.11) auxiliaries for improving scratch resistance;
- at least one component E which is in turn selected from
  - (E.1) dyes; and
  - (E.2) pigments;
- at least one component F which is in turn selected from light, heat and oxidation stabilizers; and
- at least one component G which is in turn selected from IR-absorbing compounds.

The effect of the defoamers and deaerating agents (D.4), lubricants and leveling agents (D.5), thermally curing or radiation-curing auxiliaries (D.6), substrate wetting auxiliaries (D.7), wetting and dispersing auxiliaries (D.8), hydrophobizing agents (D.9), in-can stabilizers (D.10) and auxiliaries for improving scratch resistance (D.11) listed under component D usually cannot be strictly distinguished from one another. For instance, lubricants and leveling agents often additionally act as defoamers and/or deaerating agents and/or as auxiliaries for improving scratch resistance. Radiation-curing auxiliaries can in turn act as lubricants and leveling agents and/or deaerating agents and/or also as substrate wetting auxiliaries. In accordance with the above statements, a certain additive may therefore be attributed to more than one of the groups (D.4) to (D.11) described below.

The defoamers of group (D.4) include silicon-free and silicon-containing polymers. The silicon-containing polymers are, for example, unmodified or modified polydialkylsiloxanes or branched copolymers, comb copolymers or block copolymers composed of polydialkylsiloxane and polyether units, the latter being obtainable from ethylene oxide or propylene oxide.

The deaerating agents of group (D.4) include, for example, organic polymers, for instance polyethers and polyacrylates, dialkylpolysiloxanes, especially dimethylpolysiloxanes, organically modified polysiloxanes, for instance arylalkyl-modified polysiloxanes, or else fluorosilicones. The action of defoamers is based essentially on preventing foam formation or destroying foam which has already formed.

Deaerating agents act essentially in such a way that they promote the coalescence of finely distributed gas or air bubbles to larger bubbles in the medium to be deaerated, for example the inventive mixtures, and hence accelerate the escape of the gas (or of the air). Since defoamers can often also be used as deaerating agents and vice versa, these additives have been combined together under group (D.4). Such auxiliaries are, for example, obtainable commercially from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 960, Tego® Airex 970, Tego® Airex 980 and Tego® Airex 985, and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-067, BYK®-070, BYK®-080, BYK®-088, BYK®-141 and BYK®-A 530.

The auxiliaries of group (D.4) are typically used in a proportion of from about 0.05 to 3.0% by weight, preferably from about 0.5 to 2.0% by weight, based on the total weight of the composition.

The group (D.5) of the lubricants and leveling agents includes, for example, silicon-free but also silicon-containing polymers, for example polyacrylates or modified low molecular weight polydialkylsiloxanes. The modification consists in replacing some of the alkyl groups with a wide variety of organic radicals. These organic radicals are, for example, polyethers, polyesters or else long-chain alkyl radicals, the former finding most frequent use.

The polyether radicals of the correspondingly modified polysiloxanes are typically formed by means of ethylene oxide and/or propylene oxide units. The higher the proportion of these alkylene oxide units is in the modified polysiloxane, the more hydrophilic is generally the resulting product.

Such auxiliaries are obtainable commercially, for example, from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (also usable as a defoamer and deaerating agent), TEGO® Flow ATF, TEGO® Flow ATF2, TEGO® Flow 300, TEGO® Flow 460, TEGO® Flow 425 and TEGO® Flow ZFS 460. The radiation-curable lubricants and leveling agents used, which additionally also serve to improve scratch resistance, can be the products TEGO® Rad 2100, TEGO® Rad 2200, TEGO® Rad 2300, TEGO® Rad 2500, TEGO® Rad 2600, TEGO® Rad 2700 and TEGO® Twin 4000, likewise obtainable from Tego. Such auxiliaries are obtainable from BYK, for example as BYK®-300, BYK®-306, BYK®-307, BYK®-310, BYK®-320, BYK®-322, BYK®-331, BYK®-333, BYK®-337, BYK®-341, Byk® 354, Byk® 361 N, BYK®-378 and BYK®-388.

The auxiliaries of group (D.5) are typically used in a proportion of from about 0.005 to 1.0% by weight, preferably from about 0.01 to 0.2% by weight, based on the total weight of the composition.

Group (D.6) includes, as radiation-curing auxiliaries, in particular polysiloxanes with terminal double bonds which are, for example, part of an acrylate group. Such auxiliaries can be made to crosslink by actinic or, for example, electron beam radiation. These auxiliaries generally combine several properties in one. In the uncrosslinked state, they can act as defoamers, deaerating agents, lubricants and leveling agents and/or substrate wetting aids; in the crosslinked state, they increase in particular the scratch resistance, for example of articles which can be produced with the inventive compositions. The improvement in the shine performance, for example, articles can essentially be regarded as the effect of the action of these auxiliaries as defoamers, devolatilizers and/or lubricants and leveling agents (in the uncrosslinked state). The radiation-curing auxiliaries which can be used are, for example, the products TEGO® Rad 2100, TEGO® Rad 2200, TEGO® Rad 2500, TEGO® Rad 2600 and TEGO® Rad 2700 obtainable from Tego, and the product BYK®-371 obtainable from BYK. Thermally curing auxiliaries of group (D.6) comprise, for example, primary OH groups which can react with isocyanate groups.

The thermally curing auxiliaries used can, for example, be the products BYK®-370, BYK®-373 and BYK®-375 obtainable from BYK. The auxiliaries of group (D.6) are typically used in a proportion of from about 0.1 to 5.0% by weight, preferably from about 0.1 to 3.0% by weight, based on the total weight of the composition.

The auxiliaries of group (D.7) of the substrate wetting aids serve in particular to increase the wettability. The generally associated improvement in the lubricating and leveling performance of such printing compositions has an effect on the appearance of the finished (for example crosslinked) print or of the finished (for example crosslinked) layer. A wide variety of such auxiliaries are commercially available, for example, from Tego as TEGO® Wet KL 245, TEGO® Wet 250, TEGO® Wet 260 and TEGO® Wet ZFS 453, and from BYK as BYK®-306, BYK®-307, BYK®-310, BYK®-333, BYK®-344, BYK®-345, BYK®-346 and Byk®-348.

Also very suitable are the products of the Zonyl® brand from Dupont, such as Zonyl® FSA and Zonyl® FSG. These are fluorinated surfactants/wetting agents.

The auxiliaries of group (D.7) are typically used in a proportion of from about 0.01 to 3.0% by weight, preferably from about 0.01 to 1.5% by weight and especially from 0.03 to 1.5% by weight, based on the total weight of the composition.

The auxiliaries of group (D.8) of the wetting and dispersing aids serve in particular to prevent the leaching and floating and also the settling of pigments, and are therefore useful, if necessary, in pigmented compositions in particular.

These auxiliaries stabilize pigment dispersions essentially by electrostatic repulsion and/or steric hindrance of the additized pigment particles, the interaction of the auxiliary with the surrounding medium (for example binder) playing a major role in the latter case. Since the use of such wetting and dispersing aids is common practice, for example, in the technical field of printing inks and paints, the selection of such a suitable auxiliary in the given case generally presents no difficulties to the person skilled in the art.

Such wetting and dispersing aids are supplied commercially, for example, by Tego as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W, and by BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra® 5 206, BYK®-151, BYK®-154, BYK®-155, BYK®-P 104 S, BYK®-P 105, Lactimon®, Lactimon®-WS and Bykumen®. The abovementioned Zonyl® brands, such as Zonyl® FSA and Zonyl® FSG, from DuPont are also useful here.

The dosage of the auxiliaries of group (D.8) depends mainly upon the surface area of the pigments to be covered and upon the mean molar mass of the auxiliary.

For inorganic pigments and low molecular weight auxiliaries, a content of the latter of from about 0.5 to 2.0% by weight based on the total weight of pigment and auxiliary is typically assumed. In the case of high molecular weight auxiliaries, the content is increased to from about 1.0 to 30% by weight.

In the case of organic pigments and low molecular weight auxiliaries, the content of the latter is from about 1.0 to 5.0% by weight based on the total weight of pigment and auxiliary. In the case of high molecular weight auxiliaries, this content may be in the range from about 10.0 to 90% by weight. In every case, therefore, preliminary experiments are recommended, which can, though, be accomplished by the person skilled in the art in a simple manner.

The hydrophobizing agents of group (D.9) can be used with a view, for example, to providing articles obtained with inventive compositions with water-repellent properties.

This means that swelling resulting from water absorption and hence a change, for example, in the optical properties of such articles is no longer possible or at least greatly suppressed. In addition, when the compositions are used, for example, as a printing ink in 3D printing, their absorption of water can be prevented or at least greatly inhibited. Such hydrophobizing agents are commercially available, for example, from Tego as Tego® Phobe WF, Tego® Phobe 1000, Tego® Phobe 1000 S, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries of group (D.9) are used typically in a proportion of from about 0.05 to 5.0% by weight, preferably from about 0.1 to 3.0% by weight, based on the total weight of the composition.

In-can stabilizers of group (D.10) provide increased storage stability from manufacturing to curing. Examples of in-can stabilizers of group (D.10) are: Phosphites and phosphonites (processing stabilizer), for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butyl phenyl)pentaerythritol diphosphite, tristearyl sorbitol triphosphite, tetra kis(2,4-di-tert-butylphenyl) 4,4'-biphenylene diphosphonite, 6-isooctyloxy-2,4,8,10-tetra-tert-butyl-12H-dibenz[d,g]-1, 3,2-dioxaphosphocin, bis(2,4-di-tert-butyl-6-methylphenyl) methyl phosphite, bis(2,4-di-tert-butyl-6-methyl phenyl) ethyl phosphite, 6-fluoro-2,4,8,10-tetra-tert-butyl-12-methyl-dibenz[d,g]-1,3,2-dioxaphosphocin, 2,2',2''-nitrilo [triethyltris(3,3',5,5'-tetra-tert-butyl-1,1'-biphenyl-2,2'-diyl) phosphite], 2-ethyl hexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, phosphorous acid, mixed 2,4-bis(1,1-dimethylpropyl)phenyl and 4-(1,1-dimethylpropyl)phenyl triesters (GAS No. 939402-02-5), Phosphorous acid, triphenyl ester, polymer with alpha-hydro-omega-hydroxypoly[oxy(methyl-1,2-ethanediyl)], C10-16 alkyl esters (GAS No. 1227937-46-3). The following phosphites are especially preferred: Tris(2,4-di-tert-butylphenyl) phosphite, tris(nonylphenyl) phosphite,

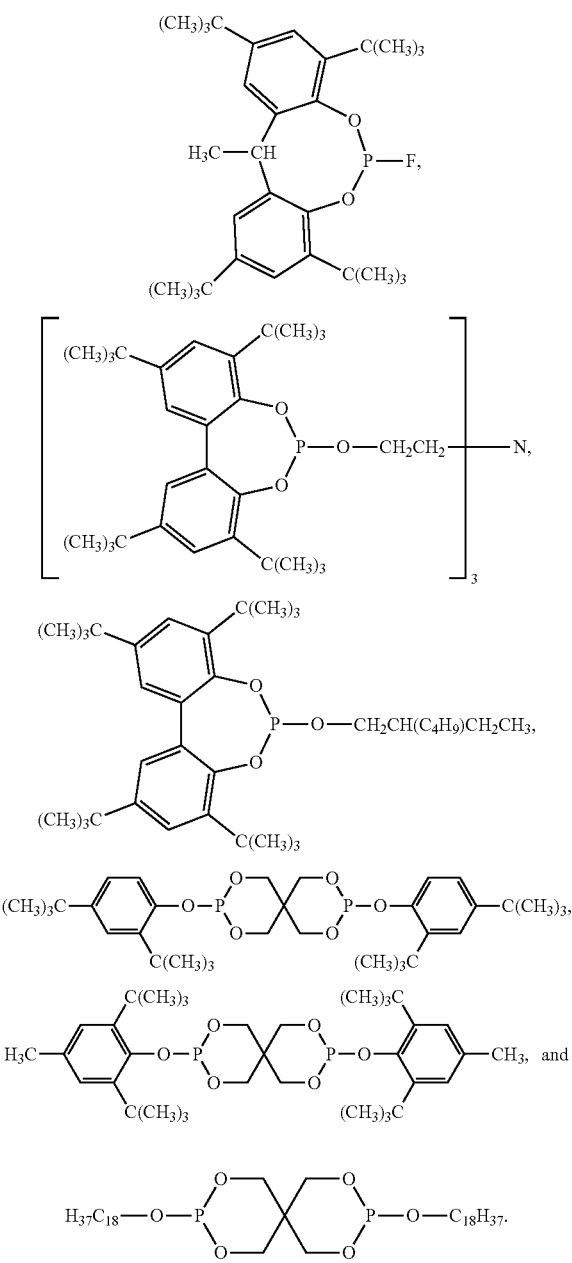

Quinone Methides of the Formula

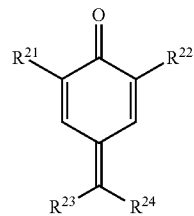

(providing long term shelf life stability), wherein $R^{21}$ and $R^{22}$ independently of each other are $C_1$-$C_{18}$alkyl, $C_5$-$C_{12}$cycloalkyl, $C_7$-$C_{15}$-phenylalkyl, optionally substituted $C_6$-$C_{10}$aryl;

$R^{23}$ and $R^{24}$ independently of each other are H, optionally substituted $C_6$-$C_{10}$-aryl, 2-, 3-, 4-pyridyl, 2-, 3-furyl or thienyl, COOH, COOR$^{25}$, CONH$_2$, CONHR$^{25}$, CONR$^{25}$R$^{26}$, —CN, —COR$^2$, —OCOR$^{25}$, —OPO(OR$^{25}$)$_2$, wherein $R^2$ and $R^{26}$ are independently of each other $C_1$-$C_8$alkyl, or phenyl. Quinone methides are preferred, wherein $R^{21}$ and $R^{22}$ are tert-butyl;

$R^{23}$ is H, and $R^{24}$ is optionally substituted phenyl, COOH, COOR$^{25}$, CONH$_2$, CONHR$^{25}$, CONR$^{25}$R$^{26}$, —CN, —COR$^{25}$, —OCOR$^{25}$, —OPO(OR$^{25}$)$_2$, wherein $R^{25}$ and $R^{26}$ are $C_1$-$C_8$alkyl, or phenyl. Examples of quinone methides are

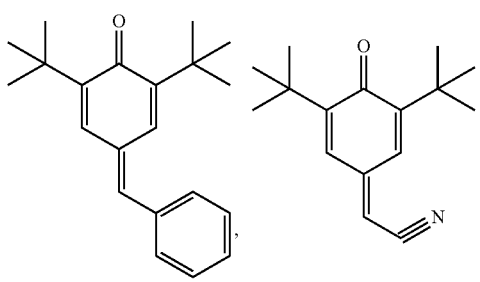

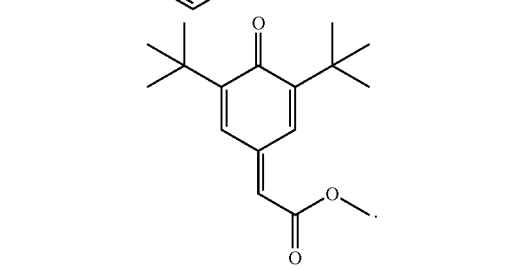

The quinone methides may be used in combination with highly sterically hindered nitroxyl radicals as described, for example, in US20110319535.

In-can stabilizers of group (D.10) are used typically in a proportion of from about 0.01 to 0.3% by weight, preferably from about 0.04 to 0.15% by weight, based on the total weight of the composition.

The group (D.11) of the auxiliaries for improving scratch resistance includes, for example, the products TEGO® Rad 2100, TEGO® Rad 2200, TEGO® Rad 2500, TEGO® Rad 2600 and TEGO® Rad 2700 which are obtainable from Tego and have already been mentioned above.

For these auxiliaries, useful amounts are likewise those mentioned in group (D.6), i.e. these additives are typically used in a proportion of from about 0.1 to 5.0% by weight, preferably from about 0.1 to 3.0% by weight, based on the total weight of the composition.

The group (E.1) of the dyes includes, for example, dyes from the class of the azo dyes, metal complex dyes, basic dyes such as di- and triarylmethane dyes and salts thereof, azomethine derivatives, polymethines, antraquinone dyes and the like. An overview of suitable dyes which can be used in the inventive mixture is given by the book by H. Zollinger, "Color Chemistry", Wiley-VCH, Weinheim, 3$^{rd}$ edition 2003.

It is in particular also possible to add to the inventive compositions photochromic, thermochromic or luminescent dyes, and dyes which have a combination of these properties. In addition to the typical fluorescent dyes, fluorescent dyes should also be understood to mean optical brighteners.

Examples of the latter include the class of the bisstyrylbenzenes, especially of the cyanostyryl compounds, and correspond to the formula

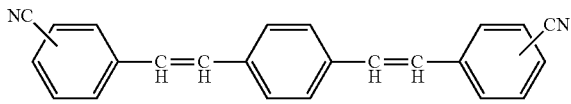

Further suitable optical brighteners from the class of the stilbenes are, for example, those of the formulae

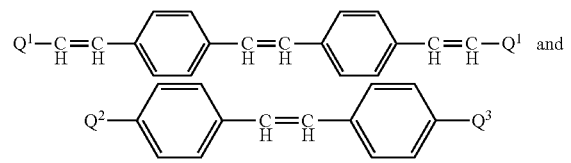

in which $Q^1$ is in each case $C_1$-$C_4$-alkoxycarbonyl or cyano, $Q^2$ is benzoxazol-2-yl, which may be mono- or disubstituted by $C_1$-$C_4$-alkyl, especially methyl, $Q^3$ is $C_1$-$C_4$-alkoxycarbonyl or 3-($C_1$-$C_4$-alkyl)-1,2,4-oxadiazol-3-yl.

Further suitable optical brighteners from the class of the benzoxazoles obey, for example, the formulae

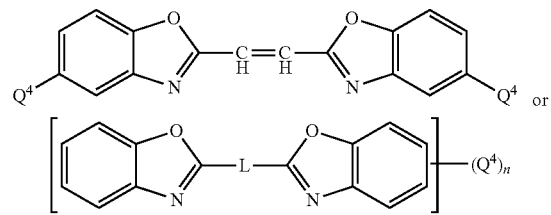

in which $Q^4$ is in each case $C_1$-$C_4$-alkyl, especially methyl, L is a radical of the formula

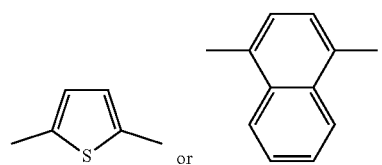

and n is an integer from 0 to 2.

Suitable optical brighteners from the class of the coumarins have, for example, the formula

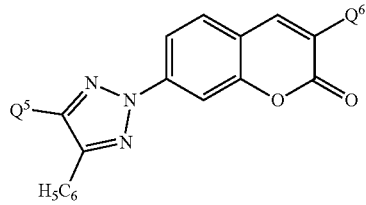

in which
$Q^5$ is $C_1$-$C_4$-alkyl and
$Q^6$ is phenyl or 3-halopyrazol-1-yl, especially 3-chloropyrazol-1-yl.

Further suitable optical brighteners from the class of the pyrenes correspond, for example, to the formula

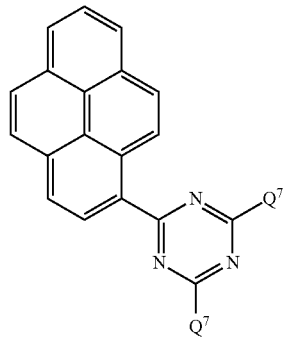

in which
$Q^7$ is in each case $C_1$-$C_4$-alkoxy, especially methoxy.

The abovementioned brighteners can be used either alone or in a mixture with one another.

The abovementioned optical brighteners are generally commercially available products known per se. They are described, for example, in Ullmann's Encyclopedia of Industrial Chemistry, 5$^{th}$ edition, volume A18, pages 156 to 161, or can be obtained by the methods described there.

In particular, if desired, one or more optical brighteners from the class of the bisstyrylbenzenes is used, especially of the cyanostyrylbenzenes. The latter may be used as individual compounds, but also as a mixture of the isomeric compounds.

In this case, the isomers correspond to the formulae

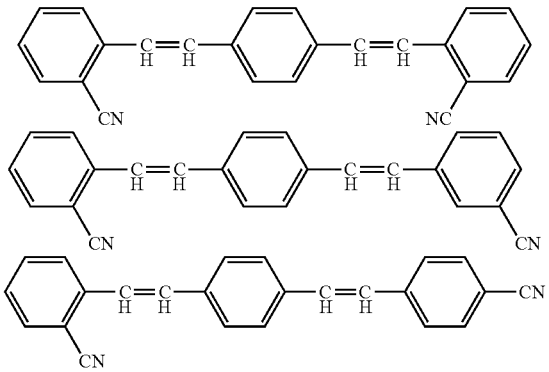

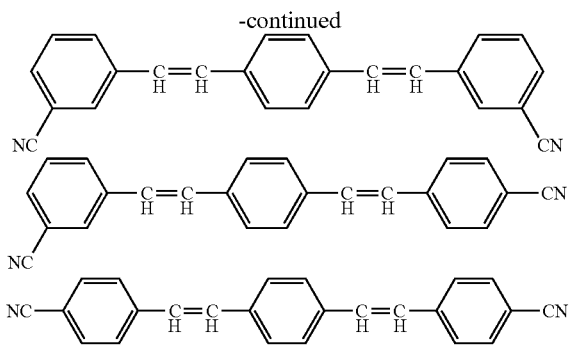

Optical brighteners are sold, for example, commercially as Ultraphor® SF 004, Ultraphor® SF MO, Ultraphor® SF MP and Ultraphor® SF PO from BASF SE.

The group (E.2) of the pigments includes both inorganic and organic pigments. An overview of inorganic colored pigments which can be used in the inventive compositions is given by the book by H. Endriß "Aktuelle anorganische Bunt-Pigmente" ["Current inorganic colored pigments"] (publisher U. Zorll, Curt-R.-Vincentz-Verlag Hanover 1997), and the book by G. Buxbaum, "Industrial Inorganic Pigments", Wiley-VCH, Weinheim, 3$^{rd}$ edition 2005. In addition, useful further pigments which are not listed in the aforementioned book are also Pigment Black 6 and Pigment Black 7 (carbon black), Pigment Black 11 (iron oxide black, $Fe_3O_4$), Pigment White 4 (zinc oxide, ZnO), Pigment White 5 (lithopone, $ZnS/BaSO_4$), Pigment White 6 (titanium oxide, $TiO_2$) and Pigment White 7 (zinc sulfide, ZnS).

An overview of organic pigments which can be added to the inventive compositions is provided by the book by W. Herbst and K. Hunger "Industrielle organische Pigmente" ["Industrial Organic Pigments"], Wiley-VCH, Weinheim, 3rd edition 2004. It is also possible to add to the inventive compositions magnetic, electrically conductive, photochromic, thermochromic or luminescent pigments, and also pigments which have a combination of these properties.

In addition to some organic pigments, for example Lumogen® Yellow 0795 (BASF SE), useful pigments having luminescent properties are also inorganic, doped or undoped compounds essentially based on alkaline earth metal oxides, alkaline earth metal/transition metal oxides, alkaline earth metal/aluminum oxides, alkaline earth metal/silicon oxides or alkaline earth metal/phosphorus oxides, alkaline earth metal halides, Zn/silicon oxides, Zn/alkaline earth metal halides, rare earth metal oxides, rare earth metal/transition metal oxides, rare earth metal/aluminum oxides, rare earth metal/silicon oxides or rare earth metal/phosphorus oxides, rare earth metal oxide sulfides or oxide halides, zinc oxide, sulfide or selenide, cadmium oxide, sulfide or selenide or zinc/cadmium oxide, sulfide or selenide, the cadmium compounds being of lower importance owing to their toxicological and ecological relevance.

The dopants used in these compounds are usually aluminum, tin, antimony, rare earth metals, such as cerium, europium or terbium, transition metals, such as manganese, copper, silver or zinc, or combinations of these elements.

Luminescent pigments are specified below by way of example, the notation "compound:element(s)" being taken to mean to the relevant person skilled in the art that said compound has been doped with the corresponding element(s). In addition, for example, the notation "(P,V)", denotes that the corresponding lattice positions in the solid structure of the pigment are randomly occupied by phosphorus and vanadium.

Examples of such compounds which are capable of luminescence are $MgWO_4$, $CaWO_4$, $Sr_4Al_{14}O_2$:Eu, $BaMg_2Al_{10}O_{27}$:Eu, $MgAl_{11}O_{19}$:Ce,Tb, $MgSiO_3$:Mn, $Ca_{10}(PO_4)_6(F,Cl)$:Sb,Mn, $(SrMg)_2P_2O_7$:Eu, $SrMg_2P_2O_7$:Sn, BaFCl:Eu, $Zn_2SiO_4$:Mn, $(Zn,Mg)F_2$:Mn, $Y_2O_3$:Eu, $YVO_4$:Eu, $Y(P,V)O_4$:Eu, $Y_2SiO_5$:Ce,Tb, $Y_2O_2S$:Eu, $Y_2O_2S$:Tb, $La_2O_2S$:Tb, $Gd_2O_2S$:Tb, LaOBr:Tb, ZnO:Zn, ZnS:Mn, ZnS:Ag, ZnS/CdS:Ag, ZnS:Cu,Al, ZnSe:Mn, ZnSe:Ag and ZnSe:Cu.

Examples of light, heat and/or oxidation stabilizers as component F include: alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, hydroquinones and alkylated hydroquinones, such as 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl) disulfide, alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-((α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4- hydroxy-2-methylphenyl)-4-n-dodecyl-mercaptobutane and 1,1,5,5-tetrakis(5-tert-butyl-4-hydroxy-2-methylphenyl) pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide and isooctyl-3,5-di-tert-butyl-4-hydroxybenzylmercaptoacetate, aromatic hydroxybenzyl compounds, such as 1,3,5-tris(3, 5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene and 2,4,6-tris(3,5-di-tert-butyl-4-hydroxybenzyl)phenol, triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl)hexahydro-1,3,5-triazine, 1,3,5-tris(3,5-dicyclohexyl-4-hydroxybenzyl) isocyanurate and 1,3,5-tris(2-hydroxyethyl) isocyanurate, benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, acylaminophenols, such as 4-hydroxylauroylanilide, 4-hydroxystearoylanilide and octyl N-(3,5-di-tert-butyl-4-hydroxyphenyl)carbamate, propionic and acetic esters, for example of monohydric or polyhydric alcohols, such as methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane and 4-hydroxymethyl-1-phospha-2,6,7-trioxabicyclo[2.2.2]octane, propionamides based on amine derivatives, such as N,N'-bis(3,5-di-tert-butyl-4-hydroxyphenylpropionyl) hexamethylenediamine, N,N'-bis(3,5-di-tert-butyl-4-hydroxyphenylpropionyl)trimethylenediamine and N,N'-bis (3,5-di-tert-butyl-4-hydroxyphenylpropionyl)hydrazine, ascorbic acid (Vitamin C) and ascorbic acid derivatives, such as ascorbyl palmitate, laurate and stearate, and ascorbyl sulfate and phosphate, antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl) sebacate, 2,2,6,6-tetramethylpiperidin-4-one and 2,2,6,6-tetramethylpiperidin-4-ol, phosphites and phosphonites, such as triphenylphosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl) methyl phosphite and bis(2,4-di-tert-butyl-6-methylphenyl) ethyl phosphite, 2-(2'-hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3', 5'-di-tert-amyl-2'-hydroxyphenyl)benzotriazole, 2-(3',5'-bis-(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-

2H-benzotriazole with polyethylene glycol 300; [R—CH$_2$CH$_2$—COO(CH$_2$)$_3$]$_2$, where R=3'-tert-butyl-4'-hydroxy-5'-2H-benzotriazol-2-ylphenyl], sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamate, dioctadecyl disulfide and pentaerythritol tetrakis(p-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl) sebacate, bis(2,2,6,6-tetramethylpiperidin-4-yl) succinate, bis(1,2,2,6,6-pentamethylpiperidin-4-yl) sebacate, bis(1-octyloxy-2,2,6,6-tetramethylpiperidin-4-yl) sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,5-tetramethylpiperidin-4-yl)hexamethylenediamine and 4-tert-octylamino-2,6-dichloro-1,3,5-triazine, tris(2,2,6,6-tetramethylpiperidin-4-yl) nitrilotriacetate, tetrakis(2,2,6,6-tetramethylpiperidin-4-yl) 1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl) 2-n-butyl-2-(2-hydroxy-3,5-di-tert-butylbenzyl) malonate, 3-n-octyl-7,7,9,9-tetramethyl-1,3,8-triazaspiro [4.5]decane-2,4-dione, bis(1-octyloxy-2,2,6,6-tetramethylpiperidin-4-yl) sebacate, bis(1-octyloxy-2,2,6,5-tetramethylpiperidin-4-yl) succinate, the condensation product of N,N'-bis(2,2,6,6-tetramethylpiperidin-4-yl)hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl) hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxospiro[4.5]decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethyloacetylenediureas and poly(methoxypropyl-3-oxy)-[4(2,2,6,6-tetramethyl)piperidinyl]siloxane, oxamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, and mixtures of ortho-, para-methoxydisubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methyl-5 phenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy) phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine and 2-(2-hydroxyphenyl)-4-(4-methoxyphenyl)-6-phenyl-1,3,5-triazine.

The components G of the IR absorber used are compounds which exhibit one or more absorption bands in the infrared spectral region, i.e. from >750 nm, e.g. from 751 nm, to 1 mm. Preference is given to compounds which exhibit one absorption band in the near infrared (NIR) spectral region, i.e. from >750 (e.g. 751) to 2000 nm, and optionally additionally also in the visible spectral region, especially from 550 to 750 nm. When the compounds absorb both in the IR and in the visible spectral region, they preferably exhibit the greatest absorption maximum in the IR region and a smaller maximum (frequently in the form of a so-called absorption shoulder) in the visible region. In a particular embodiment, the compounds of component G additionally also exhibit fluorescence. Fluorescence is the transition of a system excited by absorption of electromagnetic radiation (usually visible light, UV radiation, X-rays or electron beams) to a state of lower energy by spontaneous emission of radiation of the same wavelength (resonance fluorescence) or longer wavelength. Preferred compounds of component G exhibit, when they fluoresce, a fluorescence in the IR spectral region, preferably in the NIR.

Such compounds are, for example, selected from naphthalenes, anthracenes, phenanthrenes, tetracenes, perylenes, terrylenes, quaterrylenes, pentarylenes, hexarylenes, anthraquinones, indanthrones, acridines, carbazoles, dibenzofuranes, dinaphthofuranes, benzimidazoles, benzthiazoles, phenazines, di-, oxazines, quinacridones, metal phthalocyanines, metal naphthalocyanines, metal porphyrines, coumarines, dibenzofuranones, dinaphthofuranones, benzimidazolones, indigo compounds, thioindigo compounds, quinophthalones, naphthoquinophthalones and diketopyrrolopyrroles. Particularly preferred compounds of component G which absorb IR radiation and optionally fluoresce are selected from naphthalenes, anthracenes, phenanthrenes, tetracenes, perylenes, terrylenes, quaterrylenes, pentarylenes and hexarylenes, more preferably from perylenes, terrylenes and quaterrylenes and especially from terrylenes and quaterrylenes. The compound is especially a quaterrylene. Suitable compounds are described in WO 2008/012292, which is hereby fully incorporated by reference.

The present disclosure(s) also provides methods suitable for making 3-dimensional structures comprising a plurality of polymer layers and 3-dimensional patterns.

Accordingly, the present invention is directed to the use of the photocurable composition of the present invention in a photopolymerization 3D printing process, especially a vat photopolymerization, or photopolymer jetting.

A method for producing a three-dimensional article may comprise
a) providing the photocurable composition described herein,
b) exposing the photocurable composition to actinic radiation to form a cured cross-section,
c) repeating steps (a) and (b) to build up a three-dimensional article.

Some embodiments provide methods of patterning a polymeric image on a substrate, each method comprising;
(a) depositing a layer of photocurable composition of any one of the compositions described herein on the substrate;
(b) irradiating a portion of the layer of photocurable composition with a light having appropriate wavelength(s), thereby providing a patterned layer of polymerized and unpolymerized regions. Certain other embodiments further comprise removing the unpolymerized region of the pattern.

The method may comprise depositing a plurality of layers of a photocurable composition on a substrate before irradiation, at least one of which is the photocurable composition of the present invention.

The irradiated portion is patterned through use of a photomask, by a direct writing application of light, by interference, nanoimprint, or diffraction gradient lithography, by inkjet 3D printing, stereolithography, holography, LCD or digital light projection (DLP).

The photocurable compositions may be irradiated by any variety of methods known in the art. Patterning may be achieved by photolithography, using a positive or negative image photomask, by interference lithography (i.e., using a diffraction grating), by proximity field nanopatterning by diffraction gradient lithography, or by a direct laser writing application of light, such as by multi-photon lithography, by nanoimprint lithography, by inkjet 3D printing, stereolithography and the digital micromirror array variation of stereolithography (commonly referred to as digital light projection (DLP). The photocurable compositions are especially amenable to preparing structures using stereolithographic methods, for example including digital light projection (DLP). The photocurable compositions may be processed as bulk structures, for example using vat polymerization, wherein the photopolymer is cured directly onto a translated or rotated substrate, and the irradiation is patterned via stereolithography, holography, or digital light projection (DLP).

Stereolithography (SLA) is a form of three-dimensional (3D) printing technology used for creating models, prototypes, patterns and production parts in a layer by layer fashion (so-called "additive manufacturing") using photopolymerization, a process by which light causes chains of molecules to link, forming polymers. Those polymers then make up the body of a three-dimensional solid. Typically, an SLA additive manufacturing process uses a build platform having a build tray submerged in a liquid photosensitive material. A 3D model of the item to be manufactured is imported into an associated 3D printer software, which software slices the 3D model into 2D images that are then projected onto the build platform to expose the photopolymer.

FIG. 3 of U.S. Pat. No. 4,575,330 depicts a known prior art "top-down" approach to printing. A container 21 is filled with a UV curable liquid 22 or the like, to provide a designated working surface 23. A programmable source of ultraviolet (UV) light 26 produces a spot of ultraviolet light 27 in the plane of surface 23. The spot 27 is movable across the surface 23 by the motion of mirrors or other optical or mechanical elements that are a part of light source 26. The position of the spot 27 on surface 23 is controlled by a computer 28. A movable elevator platform 29 inside container 21 is moved up and down selectively, the position of the platform being controlled by the computer 28. The elevator platform may be driven mechanically, pneumatically, hydraulically or electrically, and it typically uses optical or electronic feedback to precisely control its position. As the device operates, it produces a three-dimensional object 30 by stepwise buildup of integrated laminate such as 30a, 30b, 30c. During this operation, the surface of the UV curable liquid 22 is maintained at a constant level in the container 21, and the spot of UV light 27 is moved across the working surface 23 in a programmed manner. As the liquid 22 cures and solid material forms, the elevator platform 29 that was initially just below surface 23 is moved down from the surface in a programmed manner by any suitable actuator. In this way, the solid material that was initially formed is taken below surface 23 and new liquid 22 flows across the surface 23. A portion of this new liquid is, in turn, converted to solid material by the programmed UV light spot 27, and the new material adhesively connects to the material below it. This process is continued until the entire three-dimensional object 30 is formed.

A computer controlled pump (not shown) may be used to maintain a constant level of the liquid 22 at the working surface 23. Appropriate level detection system and feedback networks can be used to drive a fluid pump or a liquid displacement device to offset changes in fluid volume and maintain constant fluid level at the surface 23.

Alternatively, the source 26 can be moved relative to the sensed level 23 and automatically maintain sharp focus at the working surface 23. All of these alternatives can be readily achieved by conventional software operating in conjunction with the computer control system 28.

An alternative approach is to build the item from the "bottom-up" as depicted in FIG. 4 of U.S. Pat. No. 4,575,330. In this approach, the UV curable liquid 22 floats on a heavier UV transparent liquid 32 that is non-miscible and non-wetting with the curable liquid 22.

By way of example, ethylene glycol or heavy water are suitable for the intermediate liquid layer 32. In the system of FIG. 4, the three-dimensional object 30 is pulled up from the liquid 22, rather than down and further into the liquid medium, as shown in the system of FIG. 3. In particular, the UV light source 26 in FIG. 4 focuses the spot 27 at the interface between the liquid 22 and the non-miscible intermediate liquid layer 32, the UV radiation passing through a suitable UV transparent window 33, of quartz or the like, supported at the bottom of the container 21.

According to WO2018106977, and in lieu of printing just from resin in its liquid phase, one or more layers of the item are printed from resin that is foamed (at the build surface 23).

FIG. 3 of WO2018106977 depicts a representative implementation of an additive manufacturing method and apparatus wherein resin foam is the source material for the printer. A top-down printing method is depicted. In this example embodiment, the SLA apparatus comprises a radiation source 300 (e.g., DLP, laser, electron beam (EB), x-ray, etc. and scanner), a movement control mechanism 302 (e.g., a stepper motor) that moves a build platform 304 vertically up and down within a tank 305 that holds the photopolymer resin 306, and a sweeper 308 (also known as a "recoater" blade) that sweeps horizontally. These elements are used to print a part 310 in the manner previously described. The SLA apparatus is augmented with a foam producing and dispensing mechanism to facilitate production of resin foam at the printer interface, namely, the layer being printed. To this end, the mechanism comprises a foaming or pressure vessel 312, an electromechanical valve 314, and a hose or tube 316. A manifold 318 is attached to the sweeper 308 to evenly distribute the foamed resin across the top layer of the build surface. In particular, and as depicted, the foaming vessel receives liquid resin and a suitable gas (e.g., $CO_2$, $N_2O$, etc.). Gas is dissolved in the liquid resin within the foaming vessel (e.g., by shaking, missing, agitation, etc.) and selectively delivered to the build plate/platform via the hose 316 when the valve 314 is actuated, e.g., by a solenoid or other electromechanical, pneumatic, optical or electronic control device. Typically, the mechanism is under program control using a computer, which may be the same computer used to control the printer. In this embodiment, the mechanism includes a frother 320 (e.g., a mechanical agitator, an ultrasonic device, etc.) to shake or otherwise dissolve the gas within the liquid vessel if needed to produce foam.

Upon delivery of the resin and gas mixture (directly onto the build plate via the manifold 318), the gas spontaneously evolves out of the liquid mixture (due to the lower pressure) to produce a foam that is radiation-curable. The sweeper 308 spreads the foam evenly onto the plate, and the light engine is then activated to display the appropriate image to cure (solidify) the foam into a layer. Once the layer is formed, the movement control mechanism moves the platform down so that the next layer of the item can be built; the process is then repeated, once again preferably using the foam layer at the print interface. While the preferred technique uses layer-wise additive manufacturing, other manufacturing processes may be used to process the foam to produce the build item, such as, for example, laser holography, wherein two lasers intersect in a tank of foamed resin and cure the resin at that spot.

The photocurable composition of the present is preferably used in a vat photopolymerization.

In one embodiment the present invention relates to a method comprising a vat photopolymerization, wherein the photocurable composition of the present invention is cured directly onto a translated or rotated substrate, and the irradiation is patterned via stereolithography, holography, or digital light projection (DLP).

In another embodiment the present invention relates to a method for manufacturing a three-dimensional article with photocurable composition of the present invention, comprising the steps of:

a) producing a first layer of the photocurable composition of the present invention;

b) exposing said first layer to UV radiation, so as to solidify said first layer with a predetermined pattern;

c) applying a second layer of the photocurable composition of the present invention onto the first solidified layer;

d) exposing said second layer to UV radiation, so as to solidify said second layer with a predetermined pattern;

e) repeating steps a) to d) until a predetermined three-dimensional article is formed.

The present invention is also directed to a three-dimensional article, which is obtainable according to the methods described above.

In addition, the present invention is also directed to a three-dimensional article, which is a cured product of the photocurable composition of the present invention.

The following examples illustrate the invention without restricting it.

EXAMPLES

General Urethane (Meth)Acrylate Synthesis

Urethane (meth)acrylates were prepared filling the calculated amount of isocyanate (TDI, HDI, H12MDI, IPDI) in a suitable 3-neck round-bottom flask equipped with temperature element PT100, nitrogen flow, mechanic stirrer and heating hood. The material was heated to 50° C. In some experiments (compare recipes in Table 1), the catalyst 1 was added. Subsequently the polyol 1 was added. Any additional polyol 2, if used, was added afterwards. After addition of all components, the system was flushed with nitrogen and kept under nitrogen atmosphere during the reaction. The mixture was heated to 80° C. and kept at this temperature for 2 h. Then, the mixture was allowed to cool down to 60° C. and the NCO value of the prepolymer was determined. The amount of hydroxyalkyl(meth)acrylate needed to saturate all NCO groups was calculated and added under air at 60° C. The reaction mixture was stirred at this temperature for 1 h what typically led to a decrease in NCO to almost 0. The final urethane acrylate was kept at room temperature (RT) under air in a suitable vial. After 24 h, the viscosity was measured.

NCO content was determined following DIN EN ISO 11909: primary and secondary amines react with free isocyanate groups to urea groups. This reaction is quantitative under excess of amine. After the complete reaction, the excess amine is determined by back titration with hydrochloric acid.

Polyol viscosity was determined at 60° C. in accordance with DIN EN ISO 3219 using a cone/plate Brookfield viscometer/CAP 2000+ and a spindle with diameter of 9.53 mm and an angle of 1.8° at a shear rate of 100 s−1.

Preparation of Inventive Photopolymers and Specimen for Mechanical Testing 25 g of the synthesized urethane (meth)acrylates were mixed with acryloylmorpholine at a ratio as specified in Table 2 and 1.5 wt-% photoinitiator TPO by stirring at 70°

C. for 30 minutes in a water bath using a 100 ml glass jar which was protected against daylight with aluminum foil. The resulting clear, slightly yellowish mixtures were transferred at 40 to 50° C. into home-made silicone molds (ProtoSil RTV 245, altropol, shore hardness 50) and cured stepwise: Step 1—curing under a low-energy UVA fluorescent lamp (Silvania Blacklight BL368) at 10 cm distance for 60 seconds. Step 2—curing under a 365 nm UV-LED (Hoenle Powerline AC) placed over a conveyor belt (500 mJ/cm² per pass) at a total UV dose of 2500 mJ/cm² (tensile test, 2 mm specimen thickness) and 5000 mJ/cm² (Izod impact strength, 4 mm specimen thickness). The specimens were irradiated on both sides to ensure homogeneous curing. After storage for 24 hours at 50% relative humidity the mechanical properties of the specimen were tested according to DIN EN ISO 527-1 (specimen type 5A) using Zwick Roell 10 kN Pro Line and DIN EN ISO 180 using a Zwick Roell HIT pendulum impact tester B5113.300 (5.5 J pendulum).

The viscosities of the photopolymers were determined at 50° C. at 100 s$^{-1}$ shear rate using a cone/plate (60 mm diameter, 2° cone angle) rheometer (HR-1 Discovery, TA Instruments).

All UV doses were measured with a UV-Control 3CT, UV-technik meyer gmbh.

TDI: is a mixture of 2,4-Toluene diisocyanate (2,4-TDI, 80%) and 2,6-TDI (20%) with a NCO content of 48%. Trade name BASF: Lupranat T 80 A HDI: is 1,6-Hexane diisocyanate with a NCO content of 50%. Trade name BASF: Basonat H H12MDI: is Dicyclohexylmethane-4,4'-diisocyanate with a NCO content of 32%. Trade name Evonik: Vestanat H12MDI IPID: is Isophorondiisocyanate with a NCO content of 38%. Trade name Evonik: Vestanat IPDI Polyol 1: is a Polyester polyol based on adipic acid, ethylene glycol and 1,4-butanediol; OH value=55 mg KOH/g, functionality=2. Trade name BASF: Lupraphen 6601/3

Polyol 2: is Propane-1,2,3-triol from BASF.

Catalyst 1: is a tin based catalyst. Trade name BASF: Fomrez UL 28.

HEA: is Hydroxyethylacrylate purchased from Sigma Aldrich (96%, contains 200-650 ppm monomethyl ether hydroquinone as inhibitor)

HEMA: is Hydroxyethylmethacrylate purchased from Sigma Aldrich (97%, contains ≤250 ppm monomethyl ether hydroquinone as inhibitor)

The examples in Table 2 show that by using the inventive compositions, a combination of mechanical properties (E modulus, elongation at break and impact strength) can be achieved which was not possible so far. While by changing the Laromer® UA 9089: acryloylmorpholine ratio, E modulus can be increased or decreased in the comparative examples, the corresponding impact strength values obtained by the compositions of the comparative examples are significantly lower compared to the impact strength values obtained by the compositions of examples 1 to 5. In addition, elongation at break is substantially higher for the inventive compositions confirming their superior mechanical properties.

TABLE 1

|  | Polyester urethane acrylate 1 | Polyester urethane methacrylate 1 | Polyester urethane acrylate 2 | Polyester urethane acrylate 3 | Polyester urethane acrylate 4 |
| --- | --- | --- | --- | --- | --- |
| TDI [g] | 19.5 | 19.5 | — | — | — |
| HDI [g] | — | — | 20.7 | — | — |
| H12MDI [g] | — | — | — | 20.1 | — |
| IPDI [g] | — | — | — | — | 20.0 |
| Polyol 1 [g] | 80.5 | 80.5 | 79.3 | 79.9 | 80.0 |
| Polyol 2 [g] | 0.5 | — | — | — | — |
| Catalyst 1 | — | — | — | — | 0.01 |
| HEA [g] | 14.7 | — | 19.8 | 7.9 | 10.2 |
| HEMA [g] | — | 19 | — | — | — |

TABLE 2

| Component | Example 1 Wt-% | Example 2 Wt-% | Example 3 Wt-% | Example 4 Wt-% | Example 5 Wt-% | Comparative example 1 Wt-% | Comparative example 2 Wt-% | Comparative example 3 Wt-% |
| --- | --- | --- | --- | --- | --- | --- | --- | --- |
| Acryloylmorpholine[1] | 49.25 | 49.25 | 59.25 | 49.25 | 49.25 | 49.25 | 59.10 | 39.40 |
| Polyester urethane acrylate 1 | 49.25 | — | — | — | — | — | — | — |
| Polyester urethane methacrylate 1 | — | 49.25 | — | — | — | — | — | — |
| Polyester urethane acrylate 2 | — | — | 39.25 | — | — | — | — | — |
| Polyester urethane acrylate 3 | — | — | — | 49.25 | — | — | — | — |
| Polyester urethane acrylate 4 | — | — | — | — | 49.25 | — | — | — |
| Laromer ® UA 9089[2] | — | — | — | — | — | 49.25 | 39.40 | 59.1 |
| Omnirad ® TPO[3] | 1.50 | 1.50 | 1.50 | 1.50 | 1.50 | 1.50 | 1.50 | 1.50 |
| Total | 100.00 | 100.00 | 100.00 | 100.00 | 100.00 | 100.00 | 100.00 | 100.00 |
| Viscosity [mPas] at 50° C./100 s$^{-1}$ | 413 | 356 | 182 | 772 | 428 | 49 | 46 | 85 |

TABLE 2-continued

| Component | Example 1 Wt-% | Example 2 Wt-% | Example 3 Wt-% | Example 4 Wt-% | Example 5 Wt-% | Comparative example 1 Wt-% | Comparative example 2 Wt-% | Comparative example 3 Wt-% |
|---|---|---|---|---|---|---|---|---|
| E modulus [MPa] | 1280 ± 57 | 1460 ± 116 | 1322 ± 160 | 749 ± 33 | 1010 ± 24 | 1662 ± 325 | 1706 ± 214 | 1347 ± 178 |
| Tensile strength at break [MPa] | 46 ± 0.3 | 46 ± 3.5 | 40 ± 2.7 | 29 ± 6.8 | 36 ± 3.6 | 56.1 ± 5.9 | 58.0 ± 9.2 | 45.7 ± 7.1 |
| Elongation at break [%] | 150 ± 37 | 99 ± 34 | 30 ± 7.3 | 180 ± 71 | 174 ± 11 | 7.6 ± 1.9 | 3.1 ± 0.6 | 11.2 ± 4.8 |
| Izod impact strength (unnotched) [kJ/m$^2$] | >135[4] | >135[4] | 132 | >135[4] | >135[4] | 49 ± 1.9 | 35 ± 20 | 55 ± 15 |
| Izod impact strength (notched) [J/m] | 29.3 ± 1.3 | 24.9 ± 1.3 | — | — | — | 18.8 ± 1.1 | 21.1 ± 1.9 | 20.3 ± 1.1 |

[1]Rahn AG, [2]BASF, [3]IGM Resins, [4]limit of impact strength testing equipment (5.5 J pendulum)

The invention claimed is:

1. A photocurable composition, comprising (A) a polyester urethane acrylate, or methacrylate (A), (B) an acrylamide, or methacrylamide component (B), and (C) a photoinitiator (C), wherein the amount of component (A) is 30 to 60% by weight and the amount of component (B) is 40 to 70% by weight based on the amount of components (A) and (B), and wherein the polyester urethane acrylate, or methacrylate (A) is obtained by reacting (A1) a hydroxyalkylacrylate, or hydroxyalkylmethacrylate, (A2) an aliphatic diisocyanate, an aliphatic polyisocyanate, a cycloaliphatic diisocyanate, a cycloaliphatic polyisocyanate, an aromatic diisocyanate, or an aromatic polyisocyanate, or mixtures thereof, (A3) a polyester polyol, wherein the polyester polyol (A3) is derived from adipic acid and ethylene glycol and 1,4-butanediol, and (A4) optionally a second polyol.

2. The photocurable composition according to claim 1, wherein component (A1) is selected from the group consisting of 2-hydroxyethyl acrylate, 2-hydroxyethyl methacrylate, 2- or 3-hydroxypropyl acrylate, 2- or 3-hydroxypropyl methacrylate, 4-hydroxybutyl methacrylate, and 4-hydroxybutyl acrylate.

3. The photocurable composition according to claim 1, wherein component (A2) is selected from the group consisting of 4,4'-, 2,4'- and/or 2,2'-methylenedicyclohexyl diisocyanate (H12MDI), isophorone diisocyanates (IPDI), or tolylene 2,4- and/or 2,6-diisocyanate (TDI).

4. The photocurable composition according to claim 1, wherein the molar ratio of ethylene glycol to 1,4-butanediol in (poly(ethylene 1,4-butylene adipate) diol) is from 0.5:1 to 1.5:1.

5. The photocurable composition according to claim 1, wherein the polyester polyol has a number average molecular weight within the range of $4 \times 10^2$ to $7.0 \times 10^3$.

6. The photocurable composition according to claim 1, wherein the second polyol (A4) is glycerol.

7. The photocurable composition according to claim 1, wherein the acrylamide, or methacrylamide component (B) is acryloylmorpholine.

8. The photocurable composition according to claim 1, wherein the photoinitiator (C) is a compound of the formula

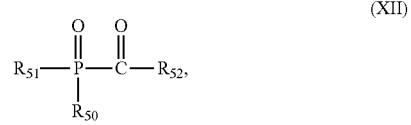

(XII)

$R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$;

or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{51}$ is —(CO)R'$_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;

$R_{52}$ and R'$_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;

$R_{33}$ and $R_{34}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl, or the photoinitiator (C) is a mixture of a compound of the formula (XII) and a compound of the formula

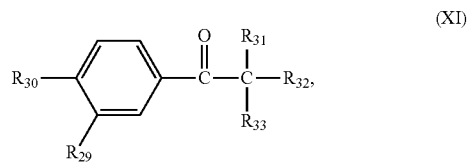

(XI)

wherein
R$_{29}$ is hydrogen or C$_1$-C$_{18}$ alkoxy;
R$_{30}$ is hydrogen, C$_1$-C$_{18}$alkyl, C$_1$-C$_{12}$hydroxyalkyl, C$_1$-C$_{18}$alkoxy, OCH$_2$CH$_2$—OR$_{34}$, morpholino, S—C$_1$-C$_{18}$alkyl, a group —HC=CH$_2$, —C(CH$_3$)=CH$_2$,

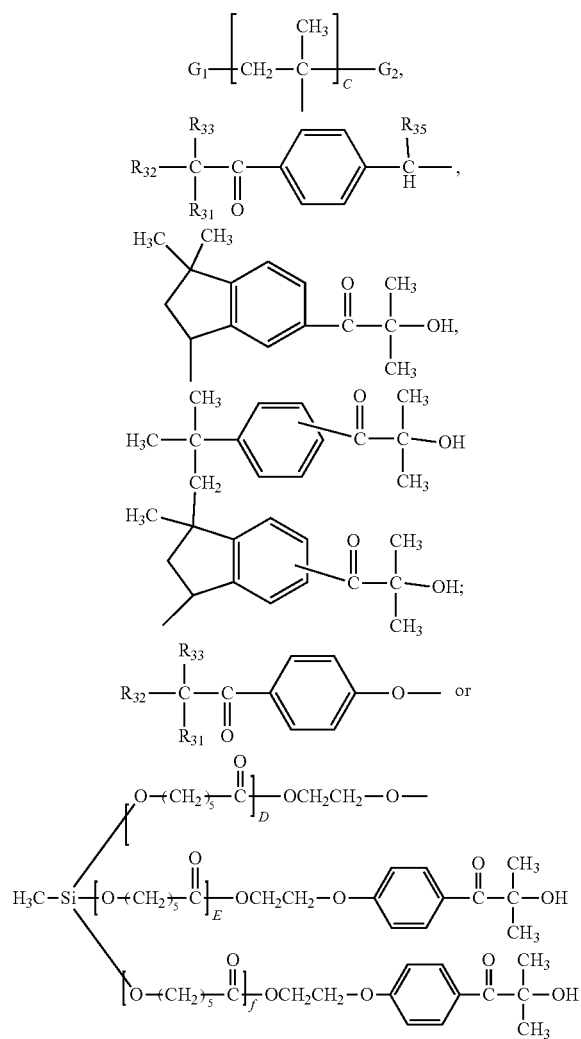

D, E and f are 1-3;
c is 2-10;
G$_1$ and G$_2$ independently of one another are end groups of the polymeric structure;
R$_{34}$ is hydrogen,

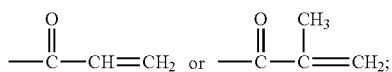

R$_{31}$ is hydroxy, C$_1$-C$_{16}$alkoxy, morpholino, dimethylamino or —O(CH$_2$CH$_2$O)$_g$—C$_1$-C$_{16}$alkyl;
g is 1-20;
R$_{32}$ and R$_{33}$ independently of one another are hydrogen, C$_1$-C$_6$alkyl, C$_1$-C$_{16}$alkoxy or —O(CH$_2$CH$_2$O)$_g$—C$_1$-C$_{16}$alkyl; or are unsubstituted phenyl or benzyl; or phenyl or benzyl substituted by C$_1$-C$_{12}$-alkyl; or R$_{32}$ and R$_{33}$ together with the carbon atom to which they are attached form a cyclohexyl ring;

R$_{35}$ is hydrogen, OR$_{36}$ or NR$_{37}$R$_{38}$;
R$_{36}$ is hydrogen, C$_1$-C$_{12}$alkyl which optionally is interrupted by one or more non-consecutive O-atoms and which uninterrupted or interrupted C$_1$-C$_{12}$alkyl optionally is substituted by one or more OH,
or R$_{36}$ is

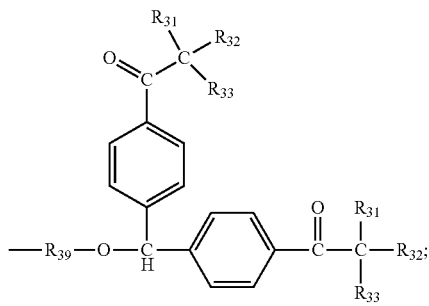

R$_{37}$ and R$_{38}$ independently of each other are hydrogen or C$_1$-C$_{12}$alkyl which is unsubstituted or is substituted by one or more OH;
R$_{39}$ is C$_1$-C$_{12}$alkylene which optionally is interrupted by one or more non-consecutive O, —(CO)—NH—C$_1$-C$_{12}$alkylene-NH—(CO)— or

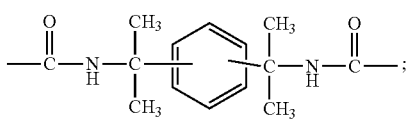

with the proviso that R$_{31}$, R$_{32}$ and R$_{33}$ not all together are C$_1$-C$_{16}$alkoxy
or —O(CH$_2$CH$_2$O)$_g$—C$_1$-C$_{16}$alkyl, or the photoinitiator is a mixture of different compounds of the formula (XII), or the photoinitiator is a mixture of compounds of the formula (XII) and (XI).

9. The photocurable composition according to claim 1, wherein components (A) and (B) are the only components of the composition which comprise photopolymerizable groups.

10. A method for producing a three-dimensional article, comprising
a) providing the photocurable composition according to claim 1,
b) exposing the photocurable composition to actinic radiation to form a cured cross-section, and
c) repeating steps (a) and (b) to build up a three-dimensional article.

11. The method according to claim 10, comprising a vat photopolymerization, wherein the photocurable composition in step b) is cured directly onto a translated or rotated substrate, and the irradiation is patterned via stereolithography, holography, or digital light projection (DLP).

12. The method according to claim 10, comprising
a) applying a layer of the photocurable curable composition of onto a surface;
b) exposing the layer imagewise to actinic radiation to form an imaged cured cross-section;
c) applying a second layer of the photocurable composition onto the previously exposed imaged cross-section;
d) exposing the layer from step (c) imagewise to actinic radiation to form an additional imaged cross-section, wherein the radiation causes curing of the second layer in the exposed areas and adhesion to the previously exposed cross-section; and e) repeating steps (c) and (d) in order to build up a three-dimensional article.

13. A three-dimensional article, which is a cured product of the photocurable composition according to claim 1.

14. A method of using the photocurable composition according to claim 1, the method comprising using the photocurable composition in a photopolymerization 3D printing process or photopolymer jetting.

15. The photocurable composition according to claim 1, comprising
   (A) a polyester urethane acrylate, or methacrylate (A),
   (B) an acrylamide, or methacrylamide component (B), and
   (C) a photoinitiator (C), wherein the amount of component (A) is 45 to 55% by weight and the amount of component (B) is 45 to 55% by weight based on the amount of components (A) and (B).

16. The photocurable composition according to claim 1, wherein the molar ratio of ethylene glycol to 1,4-butanediol in (poly(ethylene 1,4-butylene adipate) diol is from 0.75:1 to 1.25:1.

17. The photocurable composition according to claim 8, wherein
   $G_1$ and $G_2$ independently of one another are hydrogen or methyl.

18. A three-dimensional article, which is a cured product of the photocurable composition which is produced by the method of claim 10.

19. The photocurable composition according to claim 1, wherein the photocurable composition does not comprise a tetrafunctional acrylate or methacrylate component.

* * * * *